US012750157B2

(12) United States Patent
Zhou et al.

(10) Patent No.: US 12,750,157 B2
(45) Date of Patent: Sep. 29, 2026

(54) DATA PROCESSING METHOD AND APPARATUS

(71) Applicant: Huawei Technologies Co., Ltd., Shenzhen (CN)

(72) Inventors: Yue Zhou, Shenzhen (CN); Yongxia Lyu, Shenzhen (CN); Huazi Zhang, Hangzhou (CN); Yunfei Qiao, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 309 days.

(21) Appl. No.: 18/503,766

(22) Filed: Nov. 7, 2023

(65) Prior Publication Data

US 2024/0080130 A1 Mar. 7, 2024

Related U.S. Application Data

(63) Continuation of application No. PCT/CN2022/091397, filed on May 7, 2022.

(30) Foreign Application Priority Data

May 8, 2021 (CN) ........................ 202110499122.X

(51) Int. Cl.
*H04L 1/00* (2006.01)
*H04L 5/00* (2006.01)

(52) U.S. Cl.
CPC .......... *H04L 1/0036* (2013.01); *H04L 5/0055* (2013.01)

(58) Field of Classification Search
CPC ..................................................... H04L 1/0036
USPC ........................................................ 370/328
See application file for complete search history.

(56) References Cited

U.S. PATENT DOCUMENTS

2023/0096912 A1* 3/2023 Buthler ................. H04L 1/1671 370/328
2023/0179345 A1* 6/2023 Wu ....................... H04L 1/1854 370/350

FOREIGN PATENT DOCUMENTS

CN 101465654 A 6/2009
CN 110830172 A 2/2020

OTHER PUBLICATIONS

3GPP TSG RAN WG1 Meeting #97, R1-1907214, "HARQ enhancement for NR unlicensed operation", Sharp, May 13-17, 2019, total 8 pages.
3GPP TSG RAN WG1 NB-IoT Ad-Hoc Meeting #2, R1-161902, "UCI and DL HARQ-ACK feedback for NB-IoT", Intel Corporation, Mar. 22-24, 2016, total 7 pages.
Yury Polyanskiy et al.:"Channel coding rate in the finite blocklength regime", IEEE Trans. Inf. Theory, vol. 56, No. 5, May 2010, total 53 pages.

(Continued)

*Primary Examiner* — Sibte H Bukhari
(74) *Attorney, Agent, or Firm* — Slater Matsil, LLP

(57) ABSTRACT

A first device receives first information from a second device, where the first information indicates a plurality of first moments, the plurality of first moments are used by the first device to send second information to the second device, and the second information indicates a result of decoding first data information by the first device. The first device decodes the first data information. The first device sends the second information to the second device at a first feedback moment, where the first feedback moment is a moment in the plurality of first moments.

20 Claims, 7 Drawing Sheets

(56) References Cited

OTHER PUBLICATIONS

3GPP TS 38.213 V16.5.0 (Mar. 2021): "3rd Generation Partnership Project; Technical Specification Group Radio Access Network; NR; Physical layer procedures for control (Release 16)", total 183 pages.

3GPP TS 38.331 V16.4.1 (Mar. 2021): "3rd Generation Partnership Project; Technical Specification Group Radio Access Network; NR; Radio Resource Control (RRC) protocol specification (Release 16)", total 949 pages.

* cited by examiner

DATA PROCESSING METHOD AND APPARATUS

CROSS-REFERENCE TO RELATED APPLICATIONS

This application is a continuation of International Application No. PCT/CN2022/091397, filed on May 7, 2022, which claims priority to Chinese Patent Application No. 202110499122.X, filed on May 8, 2021. The disclosures of the aforementioned applications are hereby incorporated by reference in their entireties.

BACKGROUND

A hybrid automatic repeat request (HARQ) technology is a technology that combines a forward error correction (FEC) technology and an automatic repeat request (ARQ) technology. In the FEC technology, redundant information is added, so that a receiving end can correctly decode data information. For data information that is unsuccessfully received by the receiving end, the receiving end requests, by using an ARQ mechanism, a transmitting end to retransmit the data information. For example, if the receiving end successfully receives the data information, the receiving end feeds back acknowledgement (ACK) information to the transmitting end. If the receiving end unsuccessfully obtains the data information, the receiving end feeds back negative-acknowledgement (NAK) information to the transmitting end, so that the transmitting end may retransmit the data information to the receiving end.

Currently, a moment at which the receiving end feeds back the ACK or NAK information to the transmitting end is specified and unique. However, as an application scenario changes and a decoding capability of the receiving end continuously improves, an unnecessary latency may be caused when the receiving end feeds back the ACK or NAK information to the transmitting end at the specified and unique moment. Therefore, a data processing method is urgently needed, to reduce a latency of transmitting data information by a system.

SUMMARY

This application provides a data processing method and apparatus, to reduce a latency of transmitting data by a system.

According to a first aspect, a data processing method is provided, where the method may be executed by a first device or a chip in a first device, and the method includes: A first device receives first information from a second device, where the first information indicates a plurality of first moments, the plurality of first moments are used by the first device to send second information to the second device, and the second information indicates a result of decoding first data information by the first device. The first device decodes the first data information. The first device sends the second information to the second device at a first feedback moment, where the first feedback moment is a moment in the plurality of first moments.

Optionally, the second information is acknowledgement ACK information or negative-acknowledgement NAK information.

Therefore, in this application, the second device may configure a plurality of first moments for the first device, and the first device may determine the first feedback moment from the plurality of first moments based on a decoding status of the first moment, and feed back the second information to the second device at the first feedback moment. Therefore, flexibility of feeding back, by the second device, a result of decoding data information is improved, and a latency of transmitting the data information by a system is reduced.

With reference to the first aspect, in some implementations of the first aspect, the first feedback moment is a 1st first moment in the plurality of first moments that is after the first device completes decoding of the first data information.

It should be noted that, that the first device completes decoding of the first data information may be understood as the first device finishes decoding the first data information. To be specific, the first device may successfully decode the first data information, or may determine that decoding the first data information is unsuccessful.

Therefore, in this application, after decoding the first data information, the first device may feed back, to the second device in a timely manner at the 1st first moment after the decoding is completed, a result of decoding the first data information, so that a latency of transmitting data information by a system can be reduced.

With reference to the first aspect, in some implementations of the first aspect, the plurality of first moments include a second feedback moment, the second feedback moment is a moment at which the first device needs to send third information to the second device, the third information indicates whether the first device completes decoding of the first data information at the second feedback moment, and the method further includes: The first device sends the third information to the second device at the second feedback moment.

Therefore, in this application, the second device may specify the second feedback moment, and the first device feeds back, to the second device at the second feedback moment, a status of decoding the first data information by the first device at the second feedback moment. The second device may sense the status of decoding by the first device in advance, so that a network perception rate can be improved. In addition, the second device may retransmit the first data information not at the second feedback moment, thereby unnecessary air interface overheads can also be avoided.

According to a second aspect, a data processing method is provided, where the method may be executed by a second device or a chip in a second device, and the method includes: A second device sends first information to a first device, where the first information indicates a plurality of first moments, the plurality of first moments are used by the first device to send second information to the second device, and the second information indicates a result of decoding first data information by the first device. The second device sends the first data information to the first device. The second device receives the second information sent by the first device at a first feedback moment, where the first feedback moment is a moment in the plurality of first moments.

Therefore, in this application, the second device may configure a plurality of first moments for the first device, and the first device may determine the first feedback moment from the plurality of first moments based on a decoding status of the first moment, and feed back the second information to the second device at the first feedback moment. Therefore, flexibility of feeding back, by the second device, a result of decoding data information is improved, and a latency of transmitting the data information by a system is reduced.

With reference to the second aspect, in some implementations of the second aspect, the first feedback moment is a is first moment in the plurality of first moments that is after the first device completes decoding of the first data information.

With reference to the second aspect, in some implementations of the second aspect, the plurality of first moments include a second feedback moment, the second feedback moment is a moment at which the first device needs to send third information to the second device, the third information indicates whether the first device completes decoding of the first data information at the second feedback moment, and the method further includes: The second device receives the third information sent by the first device at the second feedback moment.

With reference to the second aspect, in some implementations of the second aspect, the method further includes: The second device determines, based on the second information, whether to send retransmitted first data information to the first device. The second device sends the retransmitted first data information to the first device when the second device determines, based on the second information, to send the retransmitted first data information to the first device.

According to a third aspect, a data processing apparatus is provided, where the apparatus includes a processing unit and a transceiver unit, the processing unit is configured to decode first data information; the transceiver unit is configured to receive first information from a second device, where the first information indicates a plurality of first moments, the plurality of first moments are used by the first device to send second information to the second device, and the second information indicates a result of decoding first data information by the first device; and the transceiver unit is further configured to send the second information to the second device at a first feedback moment, where the first feedback moment is a moment in the plurality of first moments.

Therefore, in this application, the second device may configure a plurality of first moments for the first device, and the first device may determine the first feedback moment from the plurality of first moments based on a decoding status of the first moment, and feed back the second information to the second device at the first feedback moment. Therefore, flexibility of feeding back, by the second device, a result of decoding data information is improved, and a latency of transmitting the data information by a system is reduced.

With reference to the third aspect, in some implementations of the third aspect, the first feedback moment is a $1^{st}$ first moment in the plurality of first moments that is after the first device completes decoding of the first data information.

With reference to the third aspect, in some implementations of the third aspect, the plurality of first moments include a second feedback moment, the second feedback moment is a moment at which the first device needs to send third information to the second device, the third information indicates whether the first device completes decoding of the first data information at the second feedback moment, and the transceiver unit is further configured to send the third information to the second device at the second feedback moment.

According to a fourth aspect, a data processing apparatus is provided, where the apparatus includes a processing unit and a transceiver unit, the transceiver unit is configured to send first data information to a first device; the transceiver unit is further configured to send first information to the first device, where the first information indicates a plurality of first moments, the plurality of first moments are used by the first device to send second information to the second device, and the second information indicates a result of decoding first data information by the first device; and the transceiver unit is further configured to receive the second information sent by the first device at a first feedback moment, where the first feedback moment is a moment in the plurality of first moments.

Therefore, in this application, the second device may configure a plurality of first moments for the first device, and the first device may determine the first feedback moment from the plurality of first moments based on a decoding status of the first moment, and feed back the second information to the second device at the first feedback moment. Therefore, flexibility of feeding back, by the second device, a result of decoding data information is improved, and a latency of transmitting the data information by a system is reduced.

With reference to the fourth aspect, in some implementations of the fourth aspect, the first feedback moment is a it first moment in the plurality of first moments that is after the first device completes decoding of the first data information.

With reference to the fourth aspect, in some implementations of the fourth aspect, the plurality of first moments include a second feedback moment, the second feedback moment is a moment at which the first device needs to send third information to the second device, the third information indicates whether the first device completes decoding of the first data information at the second feedback moment, and the transceiver unit is further configured to receive the third information sent by the first device at the second feedback moment.

With reference to the fourth aspect, in some implementations of the fourth aspect, the processing unit is configured to determine, based on the second information, whether to send retransmitted first data information to the first device; and the transceiver unit is configured, so that the second device sends the retransmitted first data information to the first device when it is determined, based on the second information, to send the retransmitted first data information to the first device.

According to a fifth aspect, a data processing method is provided, where the method may be executed by a first device or a chip in a first device, and the method includes: A first device decodes first data information. The first device sends first request information to a second device at a first feedback moment when the first device does not complete decoding of the first data information at the first feedback moment, where the first request information indicates the first device to delay feeding back a result of decoding the first data information by the first device to the second device, and the first feedback moment is a moment that is configured by the second device and at which the first device needs to feed back the result of decoding the first data information to the second device.

Therefore, in this application, if the first device does not complete decoding of the first data information at the first feedback moment, the first device may send the first request information to the second device at the first feedback moment at which the result of decoding should be fed back to the second device, to delay feeding back the result of decoding the first data information to the second device. Therefore, the first device may obtain more time to attempt to decode the first data information, to avoid unnecessary retransmission, and reduce a latency of transmitting data by a system.

With reference to the fifth aspect, in some implementations of the fifth aspect, the method further includes: The first device obtains a second feedback moment, where the second feedback moment is a moment at which the first device sends feedback information to the second device, and the feedback information indicates a result of decoding the first data information by the first device at the second feedback moment. The first device sends the feedback information to the second device at the second feedback moment.

Optionally, the feedback information is ACK information or NAK information.

Therefore, in this application, the first device may feed back the result of decoding the first data information to the second device at the second feedback moment. In other words, the first device obtains an opportunity to feed back the result of decoding the first data information again. The second device may determine, based on the feedback information received at the second feedback moment, whether retransmission is required. In this way, unnecessary retransmission can be avoided, so that a mechanism for feeding back the result of decoding is more flexible, and can flexibly adapt to first devices having different decoding capabilities.

With reference to the fifth aspect, in some implementations of the fifth aspect, the method further includes: the obtaining, by the first device, a second feedback moment includes: The first device receives indication information from the second device, where the indication information indicates the second feedback moment, and the second feedback moment is determined by the second device based on the first request information.

Therefore, in this application, the second device may allocate a second feedback moment to the first device based on the first request information, thereby further improving flexibility of the mechanism for feeding back the result of decoding.

With reference to the fifth aspect, in some implementations of the fifth aspect, the method further includes: The first device sends second request information to the second device at the first feedback moment when the first device does not complete decoding of the first data information at the first feedback moment, where the second request information indicates a first moment, the first moment is a moment at which the first device estimates that decoding of the first data information can be completed, and the second feedback moment is determined by the second device based on the second request information.

Therefore, in this application, the first device may alternatively estimate, based on a decoding status of the first device, a first moment at which decoding the first data information can be completed, and send the first moment to the second device, so that the second device may determine the second feedback moment based on the first moment. Therefore, when determining the second feedback moment, the second device may comprehensively consider a decoding capability of the first device and an air interface resource scheduling status of current data transmission of the system, so that the system can meet requirements of different latency, power consumption, and reliability.

According to a sixth aspect, a data processing method is provided, where the method may be executed by a second device or a chip in a second device, and the method includes: A second device sends first data information to a first device. The second device receives first request information sent by the first device at a first feedback moment, where the first request information indicates the first device to delay feeding back a result of decoding the first data information by the first device to the second device, and the first feedback moment is a moment that is configured by the second device and at which the first device needs to feed back the result of decoding the first data information to the second device.

Therefore, in this application, if the first device does not complete decoding of the first data information at the first feedback moment, the first device may send the first request information to the second device at the first feedback moment at which the result of decoding should be fed back to the second device, to delay feeding back the result of decoding the first data information to the second device. Therefore, the first device may obtain more time to attempt to decode the first data information, to avoid unnecessary retransmission, and reduce a latency of transmitting data by a system.

With reference to the sixth aspect, in some implementations of the sixth aspect, the method further includes: The second device receives feedback information sent by the first device at a second feedback moment, where the second feedback moment is a moment at which the first device sends the feedback information to the second device, and the feedback information indicates a result of decoding the first data information by the first device at the second feedback moment.

With reference to the sixth aspect, in some implementations of the sixth aspect, the method further includes: The second device determines the second feedback moment based on the first request information. The second device sends indication information to the first device, where the indication information indicates the second feedback moment.

With reference to the sixth aspect, in some implementations of the sixth aspect, the method further includes: The second device receives second request information sent by the first device at the first feedback moment, where the second request information indicates a first moment, and the first moment is a moment at which the first device estimates that decoding of the first data information can be completed. The determining, by the second device, the second feedback moment based on the first request information includes: The second device determines the second feedback moment based on the first request information and the second request information.

According to a seventh aspect, a data processing apparatus is provided, where the apparatus includes a transceiver unit and a processing unit, the transceiver unit is configured to send first request information to a second device at a first feedback moment when the first device does not complete decoding first data information at the first feedback moment, where the first request information indicates the first device to delay feeding back a result of decoding the first data information by the first device to the second device, and the first feedback moment is a moment that is configured by the second device and at which the first device needs to feed back the result of decoding the first data information to the second device; and the processing unit is configured to decode the first data information.

Therefore, in this application, if the first device does not complete decoding of the first data information at the first feedback moment, the first device may send the first request information to the second device at the first feedback moment at which the result of decoding should be fed back to the second device, to delay feeding back the result of decoding the first data information to the second device. Therefore, the first device may obtain more time to attempt to decode the first data information, to avoid unnecessary retransmission, and reduce a latency of transmitting data by a system.

With reference to the seventh aspect, in some implementations of the seventh aspect, the transceiver unit is further configured to obtain a second feedback moment, where the second feedback moment is a moment at which the first device sends feedback information to the second device, and the feedback information indicates a result of decoding the first data information by the first device at the second feedback moment; and the transceiver unit is configured to send the feedback information to the second device at the second feedback moment.

With reference to the seventh aspect, in some implementations of the seventh aspect, the transceiver unit is specifically configured to receive indication information from the second device, where the indication information indicates the second feedback moment, and the second feedback moment is determined by the second device based on the first request information.

With reference to the seventh aspect, in some implementations of the seventh aspect, the transceiver unit is specifically configured to send second request information to the second device at the first feedback moment when the first device does not complete decoding of the first data information at the first feedback moment, where the second request information indicates a first moment, the first moment is a moment at which the first device estimates that decoding of the first data information can be completed, and the second feedback moment is determined by the second device based on the second request information.

According to an eighth aspect, a data processing apparatus is provided, where the apparatus includes a transceiver unit and a processing unit, the transceiver unit is configured to send first data information to a first device, and is further configured to receive first request information sent by the first device at a first feedback moment, where the first request information indicates the first device to delay feeding back a result of decoding the first data information by the first device to the second device, and the first feedback moment is a moment that is configured by the second device and at which the first device needs to feed back the result of decoding the first data information to the second device.

Therefore, in this application, if the first device does not complete decoding of the first data information at the first feedback moment, the first device may send the first request information to the second device at the first feedback moment at which the result of decoding should be fed back to the second device, to delay feeding back the result of decoding the first data information to the second device. Therefore, the first device may obtain more time to attempt to decode the first data information, to avoid unnecessary retransmission, and reduce a latency of transmitting data by a system.

With reference to the eighth aspect, in some implementations of the eighth aspect, the transceiver unit is further configured to receive feedback information sent by the first device at a second feedback moment, where the second feedback moment is a moment at which the first device sends the feedback information to the second device, and the feedback information indicates a result of decoding the first data information by the first device at the second feedback moment.

With reference to the eighth aspect, in some implementations of the eighth aspect, the processing unit is configured to determine the second feedback moment based on the first request information; and the transceiver unit is configured to send indication information to the first device, where the indication information indicates the second feedback moment.

With reference to the eighth aspect, in some implementations of the eighth aspect, the transceiver unit is configured to receive second request information sent by the first device at the first feedback moment, where the second request information indicates a first moment, and the first moment is a moment at which the first device estimates that decoding of the first data information can be completed; and the processing unit is specifically configured to determine the second feedback moment based on the first request information and the second request information.

According to a ninth aspect, a data processing method is provided, where the method may be executed by a first device or a chip in a first device, and the method includes: A first device receives condition information from a second device, where the condition information indicates a first condition, and the first condition is a condition under which the first device stops decoding first data information. The first device decodes the first data information. The first device stops decoding the first data information when the first condition is met.

Therefore, in this application, when the first condition is met for decoding the first data information, the first device may stop decoding the first data information. In other words, the first data information may be timeout, is expired, or does not meet a requirement, and the first device may directly discard the first data information, thereby reducing an unnecessary latency and reducing a latency of transmitting data by a system.

With reference to the ninth aspect, in some implementations of the ninth aspect, the first condition is that the first device does not complete decoding of the first data information at a first defined moment; or the first condition is that the first device decodes the first data information in an iterative decoding manner, and a quantity of iterations reaches a first threshold.

Therefore, in this application, the first condition may be a time for processing the first data information, or a quantity of iterations during iterative decoding. In this way, the second device may determine the first condition based on a performance objective that needs to be achieved by the system, a service type, or a running indicator of a device, thereby improving flexibility of transmitting data by the system, reducing an unnecessary latency and reducing a latency of transmitting data by the system.

With reference to the ninth aspect, in some implementations of the ninth aspect, the method further includes: The first device sends capability information to the second device, where the capability information indicates a decoding capability of the first device, and the first condition is determined by the second device based on the capability information.

Therefore, in this application, the first condition may be determined based on the capability information reported by the first device, so that the latency of transmitting data by the system can be further reduced. In addition, reliability of transmitting data by the system can also be improved.

According to a tenth aspect, a data processing method is provided, where the method may be executed by a second device or a chip in a second device, and the method includes: A second device sends condition information to a first device, where the condition information indicates a first condition, and the first condition is a condition under which the first device stops decoding first data information. The second device sends the first data information to the first device.

Therefore, in this application, when the first condition is met for decoding the first data information, the first device may stop decoding the first data information. In other words, the first data information may be timeout, is expired, or does not meet a requirement, and the first device may directly discard the first data information, thereby reducing an unnecessary latency and reducing a latency of transmitting data by a system.

With reference to the tenth aspect, in some implementations of the tenth aspect, the first condition is that the first device does not complete decoding of the first data information at a first defined moment; or the first condition is that the first device decodes the first data information in an iterative decoding manner, and a quantity of iterations reaches a first threshold.

With reference to the tenth aspect, in some implementations of the tenth aspect, the method further includes: The second device receives capability information from the first device, where the capability information indicates a decoding capability of the first device. The second device determines the first condition based on the capability information.

According to an eleventh aspect, a data processing apparatus is provided, where the apparatus includes a transceiver unit and a processing unit, the transceiver unit is configured to receive condition information from a second device, where the condition information indicates a first condition, and the first condition is a condition under which the first device stops decoding first data information; and the processing unit is configured to decode the first data information, and is further configured to stop decoding the first data information when the first condition is met.

Therefore, in this application, when the first condition is met for decoding the first data information, the first device may stop decoding the first data information. In other words, the first data information may be timeout, is expired, or does not meet a requirement, and the first device may directly discard the first data information, thereby reducing an unnecessary latency and reducing a latency of transmitting data by a system.

With reference to the eleventh aspect, in some implementations of the eleventh aspect, the first condition is that the first device does not complete decoding of the first data information at a first defined moment; or the first condition is that the first device decodes the first data information in an iterative decoding manner, and a quantity of iterations reaches a first threshold.

With reference to the eleventh aspect, in some implementations of the eleventh aspect, the transceiver unit is further configured to send capability information to the second device, where the capability information indicates a decoding capability of the first device, and the first condition is determined by the second device based on the capability information.

According to a twelfth aspect, a data processing apparatus is provided, where the apparatus includes a transceiver unit and a processing unit, the transceiver unit is configured to send first data information to a first device, and is further configured to send condition information to the first device, where the condition information indicates a first condition, and the first condition is a condition under which the first device stops decoding the first data information.

Therefore, in this application, when the first condition is met for decoding the first data information, the first device may stop decoding the first data information. In other words, the first data information may be timeout, is expired, or does not meet a requirement, and the first device may directly discard the first data information, thereby reducing an unnecessary latency and reducing a latency of transmitting data by a system.

With reference to the twelfth aspect, in some implementations of the twelfth aspect, the first condition is that the first device does not complete decoding of the first data information at a first defined moment; or the first condition is that the first device decodes the first data information in an iterative decoding manner, and a quantity of iterations reaches a first threshold.

With reference to the twelfth aspect, in some implementations of the twelfth aspect, the transceiver unit is configured to receive capability information from the first device, where the capability information indicates a decoding capability of the first device; and the processing unit is further configured to determine the first condition based on the capability information.

According to a thirteenth aspect, a communication apparatus is provided. The apparatus may include a processing unit, a sending unit, and a receiving unit. Optionally, the sending unit and the receiving unit may alternatively be a transceiver unit.

When the apparatus is a first device, the processing unit may be a processor, and the sending unit and the receiving unit may be a transceiver. The apparatus may further include a storage unit, and the storage unit may be a memory. The storage unit is configured to store instructions, and the processing unit executes the instructions stored in the storage unit, so that the first device performs the method in the first aspect. Alternatively, when the apparatus is a chip in a first device, the processing unit may be a processor, and the sending unit and the receiving unit may be an input/output interface, a pin, a circuit, or the like. The processing unit executes instructions stored in a storage unit, so that the chip performs the method in the first aspect. The storage unit is configured to store the instructions. The storage unit may be a storage unit (for example, a register or a cache) in the chip, or may be a storage unit (for example, a read-only memory or a random access memory) that is in the first device but is located outside the chip.

When the apparatus is a second device, the processing unit may be a processor, and the sending unit and the receiving unit may be a transceiver. The apparatus may further include a storage unit, and the storage unit may be a memory. The storage unit is configured to store instructions, and the processing unit executes the instructions stored in the storage unit, so that the second device performs the method in the first aspect. Alternatively, when the apparatus is a chip in a second device, the processing unit may be a processor, and the sending unit and the receiving unit may be an input/output interface, a pin, a circuit, or the like. The processing unit executes instructions stored in a storage unit, so that the chip performs the method in the first aspect. The storage unit is configured to store the instructions. The storage unit may be a storage unit (for example, a register or a cache) in the chip, or may be a storage unit (for example, a read-only memory or a random access memory) that is in the second device but is located outside the chip.

According to a fourteenth aspect, a communication apparatus is provided, including a processor and an interface circuit, where the interface circuit is configured to receive a signal from another communication apparatus other than the communication apparatus and transmit the signal to the processor, or send a signal from the processor to another communication apparatus other than the communication apparatus, and the processor is configured to implement, by using a logic circuit or executing code instructions, the method in the first aspect, the second aspect, the fifth aspect, the sixth aspect, the ninth aspect, and the tenth aspect.

According to a fifteenth aspect, a computer-readable storage medium is provided, where the computer-readable storage medium stores a computer program or instructions, and when the computer program or instructions are executed, the methods in the first aspect, the second aspect, the fifth aspect, the sixth aspect, the ninth aspect, and the tenth aspect are implemented.

According to a sixteenth aspect, a computer program product including instructions is provided, where when the instructions are run, the methods in the first aspect, the second aspect, the fifth aspect, the sixth aspect, the ninth aspect, and the tenth aspect are implemented.

According to a seventeenth aspect, a computer program is provided, where the computer program includes code or instructions, and when the code or instructions are run, the method in any one of the possible implementations of the first aspect, the second aspect, the fifth aspect, the sixth aspect, the ninth aspect, and the tenth aspect is implemented.

According to an eighteenth aspect, a chip system is provided. The chip system includes a processor, and may further include a memory, configured to implement at least one method described in the first aspect, the second aspect, the fifth aspect, the sixth aspect, the ninth aspect, and the tenth aspect. The chip system may include a chip, or may include a chip and another discrete component.

According to a nineteenth aspect, a communication system is provided, where the system includes the apparatuses according to the third aspect, the fourth aspect, the seventh aspect, the eighth aspect, the eleventh aspect, and the twelfth aspect.

DETAILED DESCRIPTION OF ILLUSTRATIVE EMBODIMENTS

Figure 1:
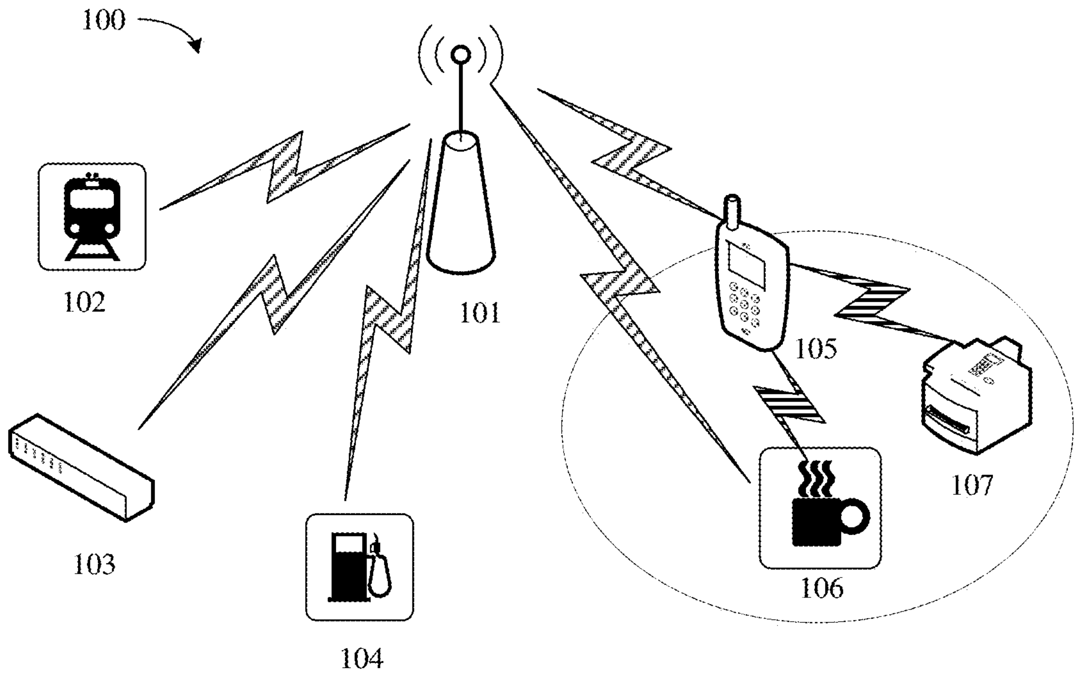
FIG. 1 is a schematic diagram of an example of data processing applicable to this application.

The following describes technical solutions of this application with reference to accompanying drawings.

The technical solutions provided in this application may be applied to various communication systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) mobile communication system, a new radio access technology (NR), and a future communication system. The 5G mobile communication system may include non-standalone (NSA) networking and/or standalone (SA) networking.

The technical solutions provided in this application may be further applied to machine type communication (MTC), long term evolution-machine (LTE-M), a device to device (D2D) network, a machine to machine (M2M) network, an internet of things (IoT) network, a satellite communication network, or another network. The IoT network may include, for example, an internet of vehicles. Communication manners in an internet of vehicles system are collectively referred to as vehicle to X (V2X, where X may represent anything). For example, V2X may include vehicle to vehicle (V2V) communication, vehicle to infrastructure (V2I) communication, vehicle to pedestrian (V2P) communication, or vehicle to network (V2N) communication.

The technical solutions provided in this application may also be applied to a future communication system, for example, a 6th generation (6G) mobile communication system. This is not limited in this application.

In embodiments of this application, an access network device may be any device with a wireless transceiver function. The device includes but is not limited to: an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a satellite, a drone base station, an access point (AP) in a wireless fidelity (Wi-Fi) system, a radio relay node, a radio backhaul node, a transmission point (TP), or a transmission and reception point (TRP) or the like, or may be a gNB or a transmission point (TRP or TP) in a 5G system, for example, in an NR system, one or a group of antenna panels (including a plurality of antenna panels) of a base station in a 5G system, or a network node that forms a gNB or a transmission point, for example, a baseband unit (BBU) or a distributed unit (DU), or the like.

In some deployments, a gNB may include a central unit (CU) and a DU. The gNB may further include an active antenna unit (AAU). The CU implements some functions of the gNB, and the DU implements some functions of the gNB. For example, the CU is responsible for processing a non-real-time protocol and a service, and implements functions of a radio resource control (RRC) layer and a packet data convergence protocol (PDCP) layer. The DU is responsible for processing a physical layer protocol and a real-time service, and implements functions of a radio link control (RLC) layer, a medium access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the access network device may be a device including one or more of a CU node, a DU node, an AAU node. In addition, the CU may be classified as an access network device in an access network (RAN), or the CU may be classified as an access network device in a core network (CN). This is not limited in this application.

An access network device provides a service for a cell, and a terminal device communicates with the cell by using a transmission resource (for example, a frequency domain resource or a spectrum resource) allocated by the access network device. The cell may belong to a macro base station (for example, a macro eNB or a macro gNB), or may belong to a base station corresponding to a small cell. The small cell herein may include: a city cell, a micro cell, a pico cell, a femto cell, and the like. These small cells have characteristics of small coverage and low transmit power, and are applicable to providing a high-rate data transmission service.

In embodiments of this application, the terminal device may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus.

The terminal device may be a device that provides voice/data connectivity to a user, for example, a handheld device or vehicle-mounted device with a wireless connectivity function. Currently, some examples of the terminal may be: a mobile phone, a tablet computer, a computer with a wireless transceiver function (such as a notebook computer or a palmtop computer), a mobile internet device (MID), a virtual reality (VR) device, an augmented reality (AR) device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device or computing device with a wireless communication function, or another processing device, vehicle-mounted device, wearable device, or a drone connected to a wireless modem, a terminal device in a 5G network, or a terminal device in a future evolved public land mobile network (PLMN).

The wearable device may also be referred to as a wearable smart device, and is a general term of wearable devices, such as glasses, gloves, watches, clothes, and shoes, that are developed by applying wearable technologies to intelligent designs of daily wear. The wearable device is a portable device that can be directly worn on the body or integrated into clothes or an accessory of a user. The wearable device is not only a hardware device, but also implements a powerful function through software support, data exchange, and cloud interaction. Generic wearable smart devices include full-featured and large-size devices that can implement complete or partial functions without depending on smartphones, such as smart watches or smart glasses, and devices that focus only on a type of application function and need to work with other devices such as smartphones, such as various smart bands or smart jewelry for monitoring physical symptoms.

In addition, the terminal device may alternatively be a terminal device in an internet of things (IoT) system. An IoT is an important part in future development of information technologies. A main technical feature of the IoT is to connect things to a network by using a communication technology, to implement an intelligent network for human-machine interconnection and thing-thing interconnection. IoT technologies can achieve massive connections, intensive coverage, and power saving for terminals by using, for example, a narrow band (NB) technology.

In addition, the terminal device may further include sensors such as a smart printer, a train detector, and a gas station. Main functions of the terminal device include: collecting data (which is a function of some terminal devices), receiving control information and downlink data of an access network device, sending electromagnetic waves, and transmitting uplink data to an access network device.

To facilitate understanding of embodiments of this application, the following first describes a communication system used in a method according to embodiments of this application in detail with reference to FIG. 1. FIG. 1 is a schematic diagram of a communication system 100 to which a method provided in an embodiment of this application is applicable. As shown in the figure, the communication system 100 may include at least one access network device, for example, an access network device 101 shown in FIG. 1. The communication system 100 may further include at least one terminal device, for example, terminal devices 102 to 107 shown in FIG. 1. The terminal devices 102 to 107 may be mobile or stationary. The access network device 101 may communicate with one or more of the terminal devices 102 to 107 over a radio link. Each access network device can provide communication coverage for a particular geographic area, and may communicate with a terminal device located in the coverage area. For example, the access network device may send configuration information to the terminal device, and the terminal device may send uplink data to the access network device based on the configuration information. For another example, the access network device may send downlink data to the terminal device. Therefore, the access network device 101 and the terminal devices 102 to 107 in FIG. 1 constitute a communication system.

Optionally, the terminal devices may communicate with each other directly. For example, direct communication between the terminal devices may be implemented using a D2D technology or the like. As shown in FIG. 1, the terminal devices 105 and 106 may directly communicate with each other using the D2D technology, and the terminal devices 105 and 107 may directly communicate with each other using the D2D technology. The terminal device 106 and the terminal device 107 may communicate with the terminal device 105 separately or simultaneously.

The terminal devices 105 to 107 may alternatively communicate with the access network device 101 separately. For example, the terminal devices 105 to 107 may communicate with the access network device 101 directly. For example, the terminal devices 105 and 106 in FIG. 1 may communicate with the access network device 101 directly. Alternatively, the terminal devices 105 to 107 may communicate with the access network device 101 indirectly. For example, the terminal device 107 in FIG. 1 communicates with the access network device 101 via the terminal device 105.

It should be understood that FIG. 1 shows an example of one access network device, a plurality of terminal devices, and communication links between the communication devices. Optionally, the communication system 100 may include a plurality of access network devices, and in a coverage area of each access network device, another quantity of terminal devices, for example, more or fewer terminal devices, may be included. This is not limited in this application.

The foregoing communication devices, for example, the access network device 101 in FIG. 1, may include an encoding device. For example, the access network device 101 may perform encoding and output an encoded sequence, and the encoded sequence is transmitted to the terminal device 102 in FIG. 1 on a channel after processing such as modulation, rate matching, or interleaving is performed on the encoded sequence. The terminal device 102 includes a decoder, configured to decode the received encoded sequence.

Optionally, a plurality of antennas may be configured for the access network device 101 and the terminal devices 102 to 107 in FIG. 1. The plurality of antennas may include at least one transmit antenna for sending a signal and at least one receive antenna for receiving a signal. In addition, each communication device further additionally includes a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal transmission and reception.

Optionally, the wireless communication system 100 may further include other network entities such as a network controller or a mobility management entity. No limitation is set thereto in this embodiment of this application.

The following describes some terms in embodiments of this application, to help a person skilled in the art have a better understanding.

HARQ technology is a technology that combines FEC and ARQ. In the FEC, a transmitting end may add redundant information when sending data, so that the receiving end can correct some errors. However, for an error that cannot be corrected by the FEC, the receiving end may request, by using an ARQ mechanism, the transmitting end to retransmit the data.

For example, the receiving end uses an error check code, for example, a cyclic convolutional code (CRC) check code, to detect whether an error occurs in a data packet in a decoding process. If no error occurs, the receiving end may return ACK to the transmitting end, to indicate that the data packet has been correctly received. After receiving the ACK, the transmitting end may continue to send a next data packet. If an error occurs, the receiving end may discard the data packet, and return NAK to the transmitting end, to indicate that the data packet is not successfully received. Therefore, after receiving the NAK, the transmitting end may resend the same data packet to the receiving end.

It should be noted that the negative-acknowledgement may also be abbreviated as NACK information.

If an error occurs when the receiving end receives a data packet, the HARQ technology with soft combining may also be used. By using the HARQ technology with soft combining, the data packet is not discarded as a whole. Instead, useful information in the data packet that cannot be correctly decoded is stored in a HARQ buffer, and the useful information is combined with a subsequently retransmitted data packet, that is, a soft combining process. In addition, the combined data packet is decoded. If the combined data packet still cannot be correctly decoded, the process of requesting retransmission and soft combining may be repeated. Therefore, compared with directly discarding a data packet and separately decoding a retransmitted data packet, by using the HARQ technology with soft combining, reliability of transmitting data can be improved. Embodiments of this application are applicable to the HARQ technology with soft combining.

Depending on whether bit information of the retransmitted data is the same as that of originally transmitted data, the HARQ technology with soft combining can be classified into the following two types: chase combining and incremental redundancy. The chase combining means that the bit information of the retransmitted data is the same as that of the originally transmitted data, and the incremental redundancy means that the bit information of the retransmitted data is different from that of the originally transmitted data. Embodiments of this application are applicable to the two types of HARQ technologies with soft combining.

In the time domain, the HARQ technology can be classified into the following two types: synchronous HARQ and asynchronous HARQ. The synchronous HARQ means that a moment for retransmitting data is a fixed moment after previously retransmitting data. In other words, in the synchronous HARQ, the transmitting end can retransmit data only in a specific subframe by using a specific HARQ process number. Therefore, a HARQ process number of the retransmitted data may be deduced from the system frame number or subframe number, and it does not need to explicitly send a HARQ process number. The asynchronous HARQ means that a moment for retransmitting data may be any moment. In other words, in the asynchronous HARQ, the transmitting end may retransmit data by using a HARQ process number in any sequence, so that scheduling flexibility can be improved.

The HARQ technology may be applied to an uplink data transmission scenario, or may be applied to a downlink data transmission scenario. For example, in the uplink data transmission scenario, an access network device feeds back ACK or NAK information corresponding to uplink data to a UE. The ACK or NAK information arrives at the UE after a specific downlink transmission delay. The UE demodulates and processes the ACK or NAK information, retransmits data based on the ACK or NAK information, and the data arrives at the access network device after a specific uplink transmission delay. The access network device processes the uplink retransmitted data after a specific processing delay, and feeds back the ACK or NAK information for the retransmitted data to the UE again. Therefore, a period from a time when the access network device feeds back the ACK or NAK information to the UE to a time when the access network device completes processing of the retransmitted data may be understood as a HARQ round-trip time (RT).

For example, in the downlink data transmission scenario, the UE feeds back ACK or NAK information to the access network device. The ACK or NAK information arrives at the access network device after a specific uplink transmission delay. The access network device demodulates and processes the ACK or NAK information, retransmits the data based on the ACK or NAK information, and the data arrives at the UE after a specific downlink transmission delay. The UE processes the downlink retransmitted data after a specific processing delay, and feeds back the ACK or NAK information for the retransmitted data to the access network device again. Therefore, a period from a time when the UE feeds back the ACK or NAK information to the access network device to a time when the UE completes processing of the retransmitted data may be understood as a HARQ RTT.

Currently, regardless of whether uplink transmission of the HARQ technology or downlink transmission of the HARQ technology is configured, a time difference between a time when the transmitting end transmits data and a time when the receiving end feeds back ACK or NAK information is specified and unique. For clarity, downlink data transmission is used as an example below.

Figure 2:
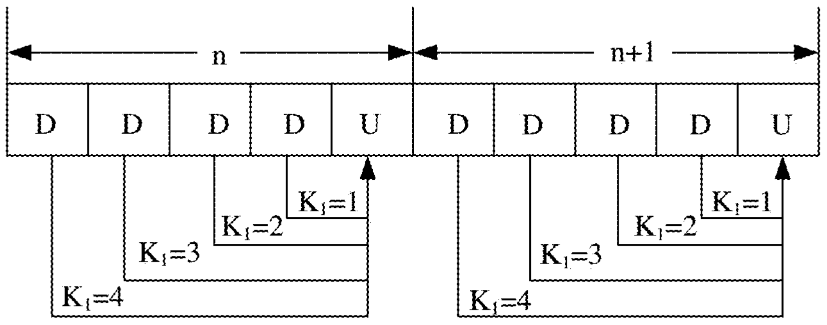
FIG. 2 is a schematic diagram of an example of HARQ timing feedback.
Figure 3:
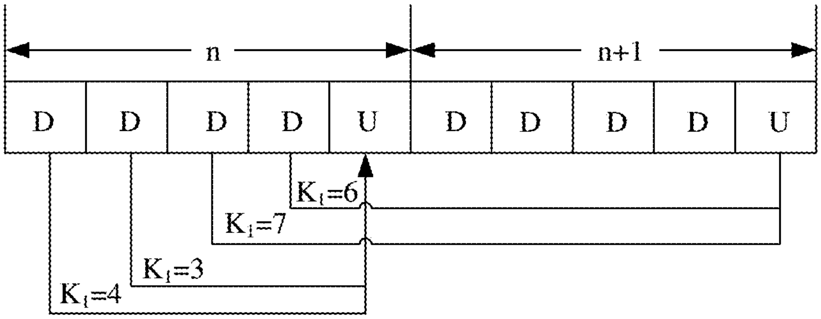
FIG. 3 is a schematic diagram of another example of HARQ timing feedback.

FIG. 2 and FIG. 3 are schematic diagrams of possible HARQ timing feedback.

A time division duplex (TDD) frame structure DDDDU is used as an example, where D represents a downlink timeslot, and U represents an uplink timeslot.

If the UE detects a physical downlink shared channel (PDSCH) in timeslot n, or if the UE detects a downlink control information (DCI) released by semi-persistent scheduling (SPS) in timeslot n, the UE sends responsive ACK or NAK information in timeslot ($n+K_1$). $K_1$ may be obtained by using a PDSCH-to-HARQ feedback timing indicator in the DCI, or may be obtained by using a parameter DI-DataToUL-ACK. For example, if $K_1$ is obtained by using a PDSCH-to-HARQ feedback timing indicator in DCI format 1_0, the timing indicator is 3 bits, and may correspondingly indicate that a value of $K_1$ is {1, 2, 3, 4, 5, 6, 7, 8}. If $K_1$ is obtained by using a PDSCH-to-HARQ feedback timing indicator in DCI format 1_1, the timer may be 0 bits, 1 bit, 2 bits, or 3 bits, and the bit width thereof may be determined by $[\log_2(I)]$, where parameter I may be determined by the number of rows of the parameter DI-DataToUL-ACK. Table 1 shows a configuration manner of the PDSCH-to-HARQ feedback timing indicator.

TABLE 1

| PDSCH-to-HARQ feedback timing indicator | | | |
|---|---|---|---|
| 1 bit | 2 bits | 3 bits | Quantity of timeslots |
| '0' | '00' | '000' | First timing value of dl-DataToUL-ACK |
| '1' | '01' | '001' | Second timing value of dl-DataToUL-ACK |
| | '10' | '010' | Third timing value of dl-DataToUL-ACK |
| | '11' | '011' | Fourth timing value of dl-DataToUL-ACK |
| | | '100' | Fifth timing value of dl-DataToUL-ACK |
| | | '101' | Sixth timing value of dl-DataToUL-ACK |
| | | '110' | Seventh timing value of dl-DataToUL-ACK |
| | | '111' | Eighth timing value of dl-DataToUL-ACK |

It can be learned that, a fixed feedback moment is set in a current HARQ feedback timing mechanism, and performance of the receiving end is not considered. If the value of $K_1$ is relatively large, even if the receiving end quickly completes data decoding, the receiving end still needs to wait for a moment indicated by $K_1$ to perform feedback, thereby increasing an unnecessary latency. If the value of $K_1$ is relatively small, for a receiving end having an advanced decoding capability, the advanced decoding capability cannot fully be utilized for an excessively short timing. Therefore, data that can be successfully decoded has to be terminated in advance, thereby increasing a latency, and causing unnecessary data retransmission and unnecessary air interface resource waste.

For example, for a receiving end having a plurality of decoding modes, although the receiving end obtains data unsuccessfully in a decoding mode, the receiving end may decode the data in another mode. In this case, an excessively short timing may cause the receiving end to have no opportunity to use another mode.

For example, for a receiving end that performs decoding by using an iterative idea, a proper increase in the number of iterations may increase a decoding time, but may improve decoding performance. An excessively short timing may cause unnecessary decoding termination, and performance of iterative decoding cannot be achieved.

This application provides a data processing method, to reduce a latency of transmitting data.

In this application, a first device is a terminal device, and a second device is an access network device; or a first device is an access network device, and a second device is a terminal device; or a first device is a terminal device, and a second device is a terminal device; or a first device is an access network device, and a second device is an access network device.

In other words, the first device and the second device may be a master-slave device or an equivalent device in any wireless communication system.

A moment in embodiments of this application may be obtained by using a frame number, a subframe number, a slot sequence number, or a symbol sequence number corresponding to the moment. This is not limited in this application.

Figure 4:
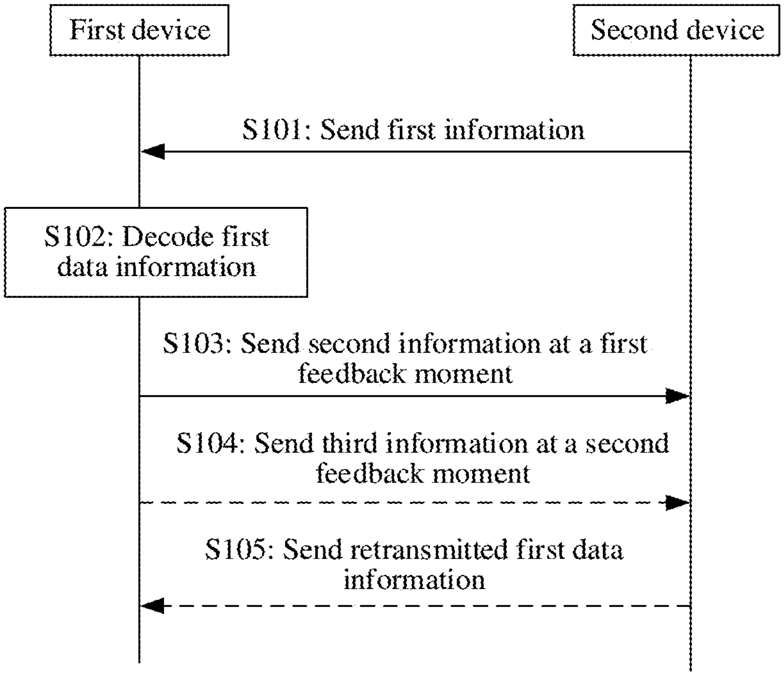
FIG. 4 is a schematic flowchart of an example of data processing according to this application.

FIG. 4 is a schematic flowchart of data processing according to an embodiment of this application.

S101: A first device receives first information from a second device, and correspondingly, the second device sends the first information to the first device.

The first information indicates a plurality of first moments, the plurality of first moments are used by the first device to send second information to the second device, and the second information indicates a result of decoding first data information by the first device.

In other words, the plurality of first moments are moments at which the first device can send the second information to the second device.

In a possible implementation, the second information is ACK or NAK information.

In a possible implementation, the first information may explicitly indicate values of the plurality of first moments.

For example, the first information is carried in DCI in physical downlink control channel (PDCCH), and the second device may indicate values of the plurality of first moments by using the DCI. Table 2 shows an example in which one bit in the DCI is used to indicate two first moments $K_A$, $K_B$. Table 3 shows an example in which two bits in the DCI are used to indicate two first moments $K_A$, $K_B$. Table 4 shows an example in which three bits in the DCI are used to indicate three first moments $K_A$, $K_B$, and $K_C$.

TABLE 2

| Indication information in DCI | Corresponding timing information |
|---|---|
| '0' | $K_A = 1$, $K_B = 5$ |
| '1' | $K_A = 2$, $K_B = 6$ |

TABLE 3

| Indication information in DCI | Corresponding timing information |
|---|---|
| '00' | $K_A = 1$, $K_B = 6$ |
| '01' | $K_A = 2$, $K_B = 7$ |
| '10' | $K_A = 3$, $K_B = 8$ |
| '11' | $K_A = 4$, $K_B = 9$ |

TABLE 4

| Indication information in DCI | Corresponding timing information |
|---|---|
| '000' | $K_A = 1$, $K_B = 6$, $Kc = 11$ |
| '001' | $K_A = 2$, $K_B = 7$, $Kc = 12$ |
| '010' | $K_A = 3$, $K_B = 8$, $Kc = 13$ |
| '011' | $K_A = 4$, $K_B = 9$, $Kc = 14$ |
| '100' | $K_A = 5$, $K_B = 10$, $Kc = 15$ |
| '101' | $K_A = 6$, $K_B = 11$, $Kc = 16$ |
| '110' | $K_A = 7$, $K_B = 12$, $Kc = 17$ |
| '111' | $K_A = 8$, $K_B = 13$, $Kc = 18$ |

In a possible implementation, the first information may implicitly indicate values of the plurality of first moments.

For example, the first information is a correspondence between the DCI and radio resource control (RRC) signaling. The second device may use the DCI to represent an index number, and a specific value is indicated by using RRC signaling. Table 5 shows a configuration manner in which values of the plurality of first moments are indicated by using RRC signaling.

TABLE 5

| Indication information in DCI | | | |
|---|---|---|---|
| 1 bit | 2 bits | 3 bits | Corresponding timing information |
| '0' | '00' | '000' | First timing value in the RRC signaling |
| '1' | '01' | '001' | Second timing value in the RRC signaling |
| | '10' | '010' | Third timing value in the RRC signaling |
| | '11' | '011' | Fourth timing value in the RRC signaling |
| | | '100' | Fifth timing value in the RRC signaling |
| | | '101' | Sixth timing value in the RRC signaling |
| | | '110' | Seventh timing value in the RRC signaling |
| | | '111' | Eighth timing value in the RRC signaling |

The second device may determine specific values of the plurality of first moments based on a current service, procedure, or bearer status.

It should be noted that the foregoing uses an example in which a timeslot number is used to represent the first moment. For example, if the first device receives the first information in the $n^{th}$ timeslot, and a value of a first moment in the plurality of first moments is $K_A$, it indicates that the first device can send the second information to the second device in the $(n+K_A)^{th}$ timeslot. A manner of representing the first moment is not limited in this application.

In a possible implementation, the plurality of first moments include a second feedback moment, and the second feedback moment is a moment at which the first device needs to send the second information to the second device.

Optionally, the first information may explicitly indicate which first moment in the plurality of first moments is the second feedback moment.

Optionally, which first moment in the plurality of first moments is the second feedback moment may be determined in a preconfigured manner.

When the second feedback moment is not the latest moment in the plurality of first moments, the first device may feed back the second information to the second device at the second feedback moment based on a status of decoding the first data information at the second feedback moment, so that the second device can sense a decoding status of the first device in advance, thereby improving a network sensing rate.

S102: The first device decodes the first data information.

Correspondingly, the second device sends the first data information to the first device.

In a possible implementation, the first device has one or more decoding manners. When the first device decodes the first data information unsuccessfully in one manner, the first device may attempt to decode the first data information in another decoding manner.

In a possible implementation, a decoding manner of the first device is an algorithm such as iterative decoding, successive cancellation list-flip decoding (SCLF), belief propagation (BP), or the like.

S103: The first device sends the second information to the second device at a first feedback moment, and correspondingly, the second device receives the second information from the first device at the first feedback moment.

The first feedback moment is a moment in the plurality of first moments.

In a possible implementation, the first feedback moment is a is first moment in the plurality of first moments that is after the first device completes decoding of the first data information.

For example, it is assumed that the first information indicates the first moment $K_A$ and $K_B$, and $K_A<K_B$. If the first device completes decoding of the first data information before the first moment $K_A$, the first device may send the second information to the second device at the first moment $K_A$. To be specific, the first device may feed back a result of decoding the first data information, for example, ACK or NAK information, so that the second device may release a reserved resource of the first moment $K_B$ after receiving the second information at the first moment $K_A$. If the first device completes decoding of the first data information before the first moment $K_B$ and after the first moment $K_A$, the first device may send the second information to the second device at the first moment $K_B$. If the first device still does not complete decoding of the first data information at the first moment $K_B$, the first device may send the second information, for example, NAK, to the second device at the first moment $K_B$.

Figure 5:
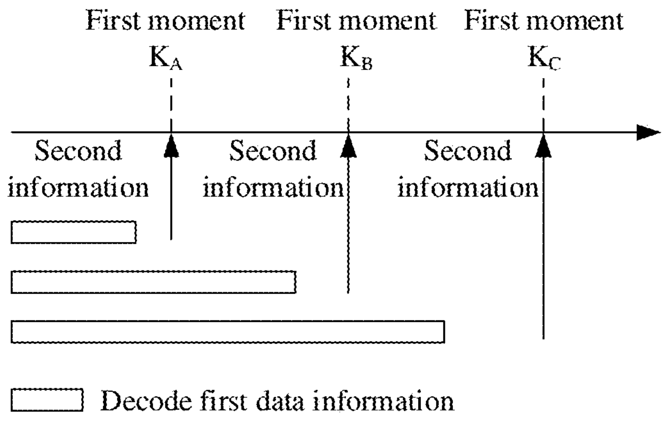
FIG. 5 is a schematic diagram of an example of feeding back a result of decoding according to this application.

For another example, description is provided with reference to FIG. 5. It is assumed that the first information indicates the first moment $K_A$, $K_B$, and $K_C$, and $K_A<K_B<K_C$. If the first device completes decoding of the first data information before the first moment $K_A$, the first device may send the second information to the second device at the first moment $K_A$. To be specific, the first device may feed back a result of decoding the first data information, for example, ACK or NAK. If the first device completes decoding of the first data information before the first moment $K_B$ and after the first moment $K_A$, the first device may send the second information to the second device at the first moment $K_B$. If the first device completes decoding of the first data information before the first moment $K_C$ and after the first moment $K_B$, the first device may send the second information to the second device at the first moment $K_C$. If the first device still does not complete decoding of the first data information at the first moment $K_C$, the first device may send the second information, for example, NAK information, to the second device at the first moment $K_C$.

It should be noted that, if the first device still does not complete decoding of the first data information at the last first moment in the plurality of first moments, the first device stops decoding, and sends the second information, for example, NAK information, to the second device at the last first moment.

That the first device completes decoding of the first data information may be explained in the following two manners.

Explanation #1

The first device successfully decodes the first data information. For example, if the first device successfully decodes the first data information before the first moment $K_A$, the first device may send the second information, for example, ACK information, to the second device at the first moment $K_A$.

Explanation #2

The first device has at least one manner of decoding the first data information, and the first device decodes the first data information unsuccessfully in all manners. For example, if the first device decodes, before the first moment $K_A$, the first data information unsuccessfully in a manner that can be used, the first device may feed back NAK to the second device at the first moment $K_A$.

To be specific, for example, at the first moment $K_A$, if the first device has successfully decoded the first data information, the first device may feed back ACK to the second device at the first moment $K_A$; or if the first device has not successfully decoded the first data information in a manner that can be used, the first device may feed back NAK to the second device at the first moment $K_A$. If the first device still performs decoding at the first moment $K_A$, that is, the first device has not completed decoding, or the first device performs decoding unsuccessfully in a manner but still does not attempt to perform decoding in another manner, the first device may not send the second information to the second device at the first moment $K_A$.

It should be noted that the foregoing is merely an example for description, and does not constitute any limitation on this application.

When the plurality of first moments include the second feedback moment, the following is performed.

S104: The first device sends third information to the second device at the second feedback moment, and correspondingly, the second device receives the third information from the first device at the second feedback moment.

The third information indicates whether the first device completes decoding of the first data information at the second feedback moment.

When the second feedback moment is not the first feedback moment, the first device may feed back the second information to the second device at the second feedback moment based on a status of decoding the first data information at the second feedback moment, so that the second device can sense a decoding status of the first device in advance, thereby improving a network sensing rate.

Figure 6:
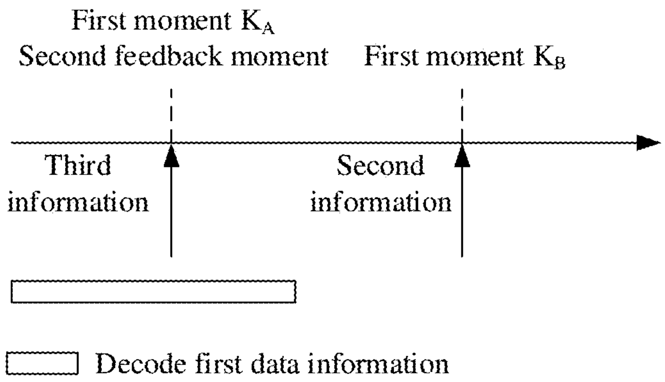
FIG. 6 is a schematic diagram of another example of feeding back a result of decoding according to this application.

With reference to FIG. 6, the first information indicates a plurality of first moments $K_A$ and $K_B$, where the first moment $K_A$ is the second feedback moment, and $K_A<K_B$. If the first device completes decoding of the first data information before the second feedback moment, the second feedback moment and the first feedback moment are a same moment, and the second information and the third information are same information. Therefore, the first device feeds back the result of decoding the first data information at the second feedback moment, for example, the ACK or NAK information. If the first device has not completed decoding of the first data information at the second feedback moment, the first device sends the third information, for example, the NAK information, to the second device at the second feedback moment. However, the first device does not stop decoding the first data information, but continues decoding. To be specific, the second device does not immediately start data retransmission even if the second device receives the NAK information at the second feedback moment. If the first device completes decoding of the first data information after the second feedback moment $K_A$ and before the first moment $K_B$, the first device still feeds back the second information to the second device at the first moment $K_B$, or if the first device still does not complete decoding of the first data information at the first moment $K_B$, the first device feeds back the second information to the second device at the first moment $K_B$.

It should be noted that, if the second feedback moment is a $1^{st}$ first moment in the plurality of first moments that is after the first device completes decoding of the first data information, that is, the first feedback moment, the second information and the third information has same content, and the result of decoding needs to be fed back only once.

When the second information indicates that the first device has not completed decoding of the first data information, the following is performed.

S105: The second device sends the retransmitted first data information to the first device based on the second information. Correspondingly, the first device receives the retransmitted first data information from the second device.

It should be noted that the bit information of the first data information that is retransmitted may be the same as or different from that of the first data information that is originally sent. This is not limited in this application.

Therefore, in this application, the second device may configure a plurality of first moments for the first device, and the first device may determine the first feedback moment from the plurality of first moments based on a decoding status of the first moment, and feed back the second information to the second device at the first feedback moment. Therefore, flexibility of feeding back, by the second device, a result of decoding data information is improved, and a latency of transmitting the data information by a system is reduced.

Figure 7:
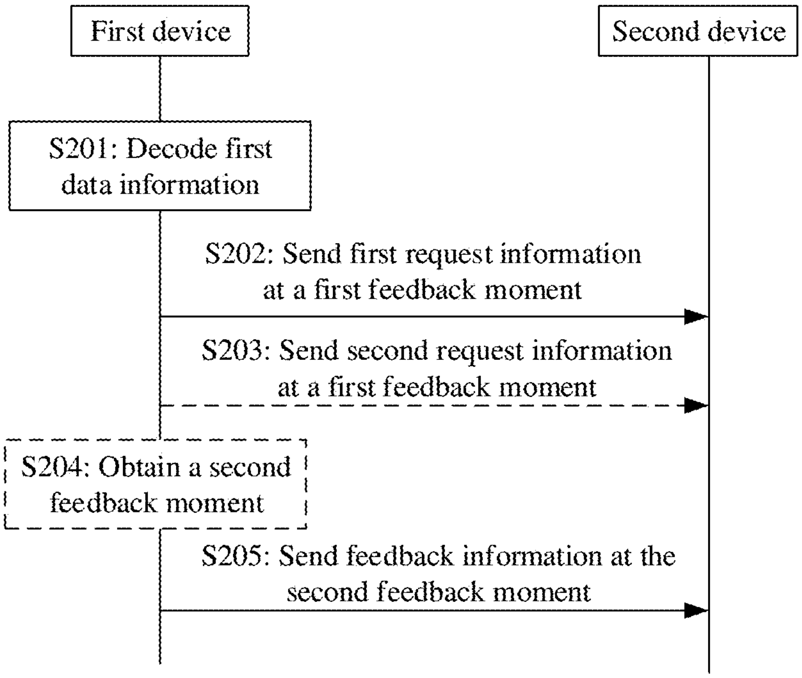
FIG. 7 is a schematic flowchart of another example of data processing according to this application.

FIG. 7 is a schematic flowchart of another data processing method.

S201: The first device decodes the first data information.

In a possible implementation, the first device has one or more decoding manners. When the first device decodes the first data information unsuccessfully in one manner, the first device may attempt to decode the first data information in another decoding manner.

In a possible implementation, a decoding mode of the first device is an algorithm such as iterative decoding, BP, SCLF, or the like.

When the first device does not complete decoding of the first data information at a first feedback moment, in S202, the first device sends first request information to a second device at the first feedback moment, and correspondingly, the second device receives the first request information sent by the first device at the first feedback moment.

The first request information indicates the first device to delay feeding back, to the second device, a result of decoding the first data information by the first device.

That is, when the first device does not complete decoding of the first data information at the first feedback moment, the first device may continue to decode the first data information, and send the first request information for delaying feedback to the second device.

In a possible implementation, the first device receives feedback indication information from the second device, and correspondingly, the second device sends the feedback indication information to the first device.

The feedback indication information indicates the first device to feed back the result of decoding the first data to the second device at the first feedback moment.

There are the following three cases in which the first device feeds back the result of decoding the first data information at the first feedback moment.

Case #1

The first device has successfully completed decoding of the first data information at the first feedback moment.

Case #2

The first device has determined, at the first feedback moment, that the decoding the first data information is unsuccessful.

For example, the first device has decoded the first data information in a decoding manner that can be used, but the decoding is unsuccessful.

Case #3

The first device has not completed decoding of the first data information at the first feedback moment.

For example, the first device is decoding the first data information in a manner at the first feedback moment, and the decoding has not been completed. Alternatively, the first device decodes the first data unsuccessfully in a manner, but the first device may decode the first data information in another manner.

In Case #1 and Case #2, the first device has completed decoding of the first data information, that is, the first device has determined, at the first feedback moment, the result of decoding the first data information. In Case #1, the first device sends acknowledgement information, for example, ACK information, to the second device. In Case #2, the first device sends negative-acknowledgement, for example, NAK information, to the second device. In Case #3, the first device sends the first request information to the second device, where the first request information indicates the first device to continue decoding the first data information after the first feedback moment. The first request information may be temporary negative-reply information, for example, temporary negative-acknowledgement (TNAK) information. To be specific, in Case #3, the first device does not stop decoding the first data information at the first feedback moment, but continues decoding and notifies the second device that the decoding is continued. In addition, the first device may further request to obtain an opportunity of feeding back the result of decoding again.

It should be noted that when the first device has completed decoding of the first data information at the first feedback moment, the first device sends acknowledgement information or negative-acknowledgement information, for example, ACK or NAK information, to the second device. When the second device receives the acknowledgement information, the second device may clear the first data information, for example, a corresponding HARQ process, and continue to transmit subsequent data information. When the second device receives the negative-acknowledgement information, the second device retransmits the first data information. For example, the second device performs HARQ based on the corresponding HARQ process. When the first device does not complete decoding of the first data information at the first feedback moment, the first device sends the first request information to the second device, and the second device does not immediately transmit the subsequent data information or immediately retransmit the first data information, but determines to perform different actions based on different cases.

In a possible implementation, in S203, the first device sends second request information to the second device at the first feedback moment, and correspondingly, the second device receives the second request information sent by the first device at the first feedback moment.

The second request information indicates a first recommended moment, where the first recommended moment is a moment at which the first device estimates that decoding of the first data information can be completed.

For example, the first device may estimate, based on a decoding status of the first device, a moment at which decoding the first data information is completed. Therefore, the second device may also determine, based on the first recommended moment, an action to be performed.

Optionally, the first device may explicitly send the first request information.

For example, when the first request information, for example, the TNAK information, is carried on a PUCCH, 2 bits may be used to represent the ACK information, the NAK information, or the TNAK information respectively. In addition, a corresponding field may be defined on the PUCCH to represent the first recommended moment $K_t$. Table 6 shows an example of explicitly representing the first recommended moment $K_t$.

TABLE 6

| Field used to indicate a first recommended moment $K_t$ | | | Corresponding timing information | |
|---|---|---|---|---|
| 1 bit | 2 bits | 3 bits | Explicit representation | High-layer indication |
| '0' | '00' | '000' | 0 | 1st RRC signaling indication value |
| '1' | '01' | '001' | 1 | 2nd RRC signaling indication value |
| | '10' | '010' | 2 | 3rd RRC signaling indication value |
| | '11' | '011' | 3 | 4th RRC signaling indication value |
| | | '100' | 4 | 5th RRC signaling indication value |
| | | '101' | 5 | 6th RRC signaling indication value |
| | | '110' | 6 | 7th RRC signaling indication value |
| | | '111' | 7 | 8th RRC signaling indication value |

Optionally, the first device may implicitly send the first request information.

For example, when the first request information, for example, the TNAK information, is carried on the PUCCH, whether the TNAK information exists may be determined depending on whether a field used to indicate the first recommended moment $K_t$ exists in the PUCCH, and 1 bit is used to represent the ACK or NAK information. If the field used to indicate the first recommended moment $K_t$ exists in the PUCCH, it indicates that the NAK information is the TNAK information. If the field used to indicate the first recommended moment $K_t$ does not exist in the PUCCH, it indicates that there is no TNAK information. Table 7 shows an example of implicitly representing the first recommended moment $K_t$.

TABLE 7

| Field used to indicate a first recommended moment $K_t$ | | | Corresponding timing information | |
|---|---|---|---|---|
| 1 bit | 2 bits | 3 bits | Explicit representation | High-layer indication |
| '0' | '00' | '000' | 0 | 1st RRC signaling indication value |
| '1' | '01' | '001' | 1 | 2nd RRC signaling indication value |
| | '10' | '010' | 2 | 3rd RRC signaling indication value |
| | '11' | '011' | 3 | 4th RRC signaling indication value |
| | | '100' | 4 | 5th RRC signaling indication value |
| | | '101' | 5 | 6th RRC signaling indication value |
| | | '110' | 6 | 7th RRC signaling indication value |
| | | '111' | 7 | 8th RRC signaling indication value |

S204: The first device obtains a second feedback moment.

The second feedback moment is a moment at which the first device sends feedback information to the second device, and the feedback information indicates a result of decoding the first data information by the first device at the second feedback moment.

In a possible implementation, the first device receives indication information from the second device, and correspondingly, the second device sends the indication information to the first device.

The indication information indicates the second feedback moment.

Optionally, the second device determines the second feedback moment based on the first request information.

For example, the second device determines the second feedback moment based on a current service, an application, a bearer, or a requirement of an upper layer.

It should be noted that, after receiving the first request information, the second device may also indicate, based on the current service, the application, the bearer, or the requirement of the upper layer, the first device not to continue decoding the first data information, but directly retransmit the first data information, or alternatively, abandon the first data information and continue to transmit subsequent information.

Optionally, when the first request information further indicates the first recommended moment, the second device may determine the second feedback moment based on the first recommended moment.

It should be noted that the second feedback moment may be earlier than the first recommended moment, or may be later than the first recommended moment. This is not limited in this application.

In another possible implementation, the first device may determine the second feedback moment based on the decoding status of the first device, and the first request information further indicates the second feedback moment.

To be specific, the first device may determine the second feedback moment based on the decoding status of the first device, and feed back the second feedback moment to the second device. In this case, the second device performs monitoring at the second feedback moment to obtain the result of decoding the first digital data by the first device.

S205: The first device sends the feedback information to the second device at the second feedback moment, and correspondingly, the second device receives the feedback information sent by the first device at the second feedback moment.

The feedback information indicates the result of decoding the first data information by the first device at the second feedback moment.

Figure 8:
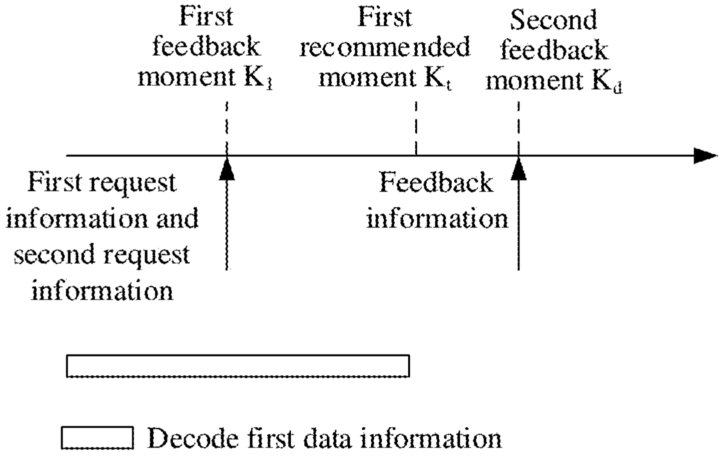
FIG. 8 is a schematic diagram of an example of delaying feeding back according to this application.

With reference to FIG. 8, a feedback manner including the first recommended moment is exemplified.

For example, the second device sends the feedback indication information to the first device, where the feedback indication information further indicates a first feedback moment $K_1$. The first device decodes the first data information. If the first device completes decoding of the first data information before the first feedback moment $K_1$, the first device feeds back the acknowledgement information or the negative-reply information, for example, the ACK or NAK information, to the second device at the first feedback moment $K_1$. If the first device does not complete decoding of the first data information at the first feedback moment $K_1$, the first device sends first request information to the second device at the first feedback moment $K_1$. The first request information indicates the first device to delay feeding back, to the second device, the result of decoding the first data information by the first device, for example, the TNAK information. The first request information further indicates the first recommended moment $K_r$. The second device determines a second feedback moment $K_d$ based on the first request information and a current scheduling status, and sends, to the first device, indication information used to feed back the second feedback moment $K_d$. The first device does not stop decoding the first data information before the first feedback moment $K_1$. If the first device completes decoding of the first data information before the second feedback moment $K_d$, the first device sends the feedback information, for example, the ACK or NAK information, to the second device at the second feedback moment $K_d$. If the first device still does not complete decoding of the first data information at the second feedback moment $K_d$, the first device may send negative-reply information, for example, the NAK information, to the second device at the second feedback moment $K_d$, and the second device may determine, at the second feedback moment, whether to retransmit the first data information.

Therefore, in this application, if the first device does not complete decoding of the first data information at the first feedback moment, the first device may send the first request information to the second device at the first feedback moment at which the result of decoding should be fed back to the second device, to delay feeding back the result of decoding the first data information to the second device. Therefore, the first device may obtain more time to attempt to decode the first data information, to avoid unnecessary retransmission, and reduce a latency of transmitting data by a system.

Figure 9:
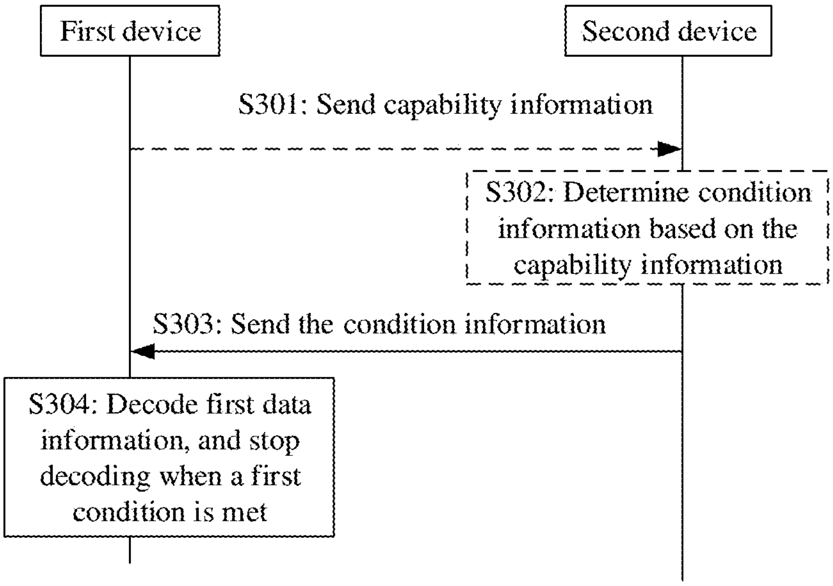
FIG. 9 is a schematic flowchart of still another example of data processing according to this application.

FIG. 9 is a schematic flowchart of another data processing method.

In a possible implementation, in S301, a first device sends capability information to a second device, and correspondingly, the second device receives the capability information from the first device.

The capability information indicates a decoding capability of the first device.

For example, the capability information may be a manner, performance, a load status, or the like in which the first device supports decoding the first data information.

For another example, when the first device performs decoding in an iterative decoding manner, the capability information may be a correspondence between a quantity of iterations and decoding performance.

Optionally, the capability information may be explicitly sent to the second device.

Optionally, a correspondence between the first device and the capability information, for example, a mapping relationship between a device type and the capability information, may be preconfigured. The second device may obtain the decoding capability of the first device based on the device type of the first device.

When the first device sends the capability information to the second device, in S302, the second device determines condition information based on the capability information.

The second device determines the condition information based on the reliability and/or latency requirement and the capability information of the first device.

For example, the second device may determine a target of a current reliability and/or latency requirement based on a current scenario, a service, a transport block (TB), a code block group (CBG), or the like. When the first device performs decoding in an iterative decoding manner, the target may be met by adjusting a quantity of iterations. When the target requires relatively high reliability, the quantity of iterations may be appropriately increased. When the target requires relatively low latency, a proper quantity of iterations may be selected based on a latency during retransmission on an air interface or a latency introduced by iterations of the first device.

In a possible implementation, the first condition is that the first device does not complete decoding of the first data information at a first defined moment.

In another possible implementation, the first condition is that the first device decodes the first data information in an iterative decoding manner, and a quantity of iterations reaches a first threshold.

S303: The first device receives the condition information from the second device, and correspondingly, the second device sends the condition information to the first device.

The condition information indicates a condition for the first device to stop decoding the first data information.

It should be noted that the second device may determine the condition information based on the reliability and/or latency requirement, or may determine the condition information based on the capability information of the first device, or may determine the condition information with reference to the reliability and/or latency requirement and the capability information of the first device.

For example, the second device may determine a first defined moment based on a service, an application, a bearer, or a requirement of an upper layer, for example, a requirement for a freshness degree. When the first defined moment arrives, the first data information expires. Therefore, the first device may stop decoding the first data information, and does not need to feed back a result of decoding the first data information to the second device. The second device does not need to retransmit the first data information. The second device directly discards the first data information that is timeout or expires, and in turn, processes information within the latency constraint range or within the information fresh period.

For another example, the first device supports decoding the first data in an iterative decoding manner. The second device may determine a first threshold, that is, a maximum number of iterations for iterative decoding, based on the capability information of the first device, the service, the application, the bearer, or the requirement of the upper layer, and the like. When decoding the first data information, the first device stops decoding the first data information when the number of iterations reaches the first threshold. The first device may choose to feed back the result of decoding the first data information to the second device based on requirements of different scenarios, so that the second device may retransmit the first data information. Alternatively, the first device may not need to feed back the result of decoding the first data information to the second device, and in turn, receive subsequent data information. Table 8 shows an example of the quantity of decoding of the first device, that is, the first threshold. The condition information may be indicated based on the service or the bearer, for example, a master cell group (MCG) Split, a secondary cell group (SCG), or an SCG Split. Alternatively, the condition information may be indicated explicitly based on DCI, or may be indicated based on DCI with reference to a parameter defined by the upper layer. Referring to Table 8, the condition information may be indicated based on other information. In other words, a manner of indicating the condition information is not limited in this application.

TABLE 8

| Condition Information | | | First threshold | |
|---|---|---|---|---|
| | | | Explicit | |
| 1 bit | 2 bits | 3 bits | indication | High-layer information indication |
| '0' | '00' | '000' | 0 | First value of downlink decoding indication information |
| '1' | '01' | '001' | 10 | Second value of downlink decoding indication information |
| | '10' | '010' | 20 | Third value of downlink decoding indication information |
| | '11' | '011' | 30 | Fourth value of downlink decoding indication information |
| | | '100' | 40 | Fifth value of downlink decoding indication information |
| | | '101' | 50 | Sixth value of downlink decoding indication information |
| | | '110' | 60 | Seventh value of downlink decoding indication information |
| | | '111' | 70 | Eighth value of downlink decoding indication information |

Optionally, in a wireless communication system in which a HARQ technology is configured, the first device sends ACK or NAK information to the second device by default. In an embodiment of this application, when feedback is not required, the second device may send, to the first device, information indicates that feedback is not required, or may be preconfigured. If the information sent by the second device to the first device does not include a field used to indicate a feedback moment, it indicates that the first device does not need to feed back the result of decoding the first data information.

S304: The first device decodes the first data information, and the first device stops decoding the first data information when the first condition is met.

In a possible implementation, the first device has one or more decoding manners. When the first device decodes the first data information unsuccessfully in one manner, the first device may attempt to decode the first data information in another decoding manner.

In a possible implementation, a decoding mode of the first device is an algorithm such as iterative decoding, SC, SCL, SCLF, or the like.

Figure 10:
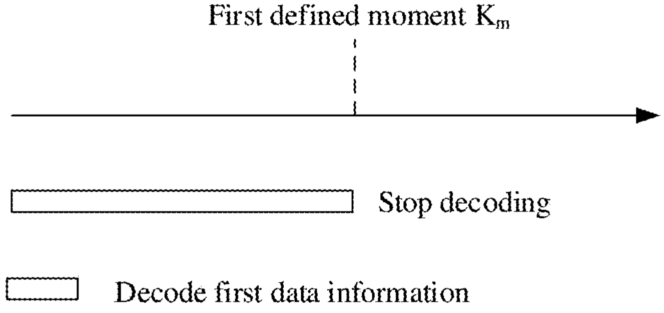
FIG. 10 is a schematic diagram of an example of stopping decoding according to this application.

For example, with reference to FIG. 10, the first device decodes the first data information. The second device sends the condition information to the first device, where the condition information indicates a first condition, and the first condition is that the first device stops decoding the first data information at a first defined moment Km. If the first device does not complete decoding of the first data information at the first defined moment Km, the first device directly stops the decoding, and does not need to feed back the result of decoding to the second device.

Therefore, in this application, when the first condition is met for decoding the first data information, the first device may stop decoding the first data information. In other words, the first data information may be timeout, is expired, or does not meet a requirement, and the first device may directly discard the first data information, thereby reducing an unnecessary latency and reducing a latency of transmitting data by a system.

Figure 11:
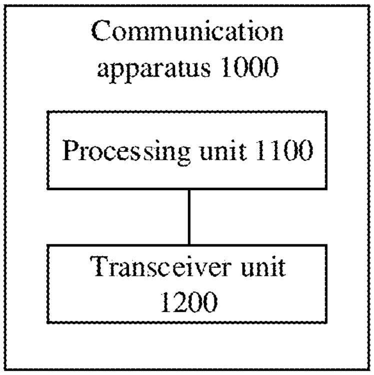
FIG. 11 to FIG. 14 are schematic diagrams of a data processing apparatus according to this application.

FIG. 11 is a schematic block diagram of a data processing apparatus according to an embodiment of this application. As shown in FIG. 11, the apparatus 1000 may include a processing unit 1101 and a transceiver unit 1200.

Optionally, the apparatus 1000 may correspond to the first device in the foregoing method embodiments, or a component (such as a circuit, a chip, a chip system, or the like) configured in the first device.

It should be understood that the apparatus 1000 may correspond to the first device in the method according to embodiments of this application, and the apparatus 1000 may include units configured to perform the method performed by the first device in FIG. 4. In addition, the units in the apparatus 1000 and the foregoing other operations and/or functions are separately intended to implement corresponding procedures in FIG. 4.

When the apparatus 1000 is configured to perform the method in FIG. 4, the processing unit 1100 may be configured to decode first data information. The transceiver unit 1200 may be configured to receive first information, where the first information indicates a plurality of first moments, the plurality of first moments are used by the first device to send second information to the second device, and the second information indicates a result of decoding first data information by the first device. The transceiver unit 1200 may be further configured to send the second information to the second device at a first feedback moment, and the first feedback moment is a moment in the plurality of first moments. It should be understood that a specific process in which the units perform the foregoing corresponding steps is described in detail in the foregoing method embodiments, and for brevity, details are not described herein.

It should be understood that the apparatus 1000 may correspond to the first device in the method according to embodiments of this application, and the apparatus 1000 may include units configured to perform the method performed by the first device in FIG. 7. In addition, the units in the apparatus 1000 and the foregoing other operations and/or functions are separately intended to implement corresponding procedures in FIG. 7.

When the apparatus 1000 is configured to perform the method in FIG. 7, the processing unit 1101 may be configured to decode the first data information. The transceiver unit 1200 may be configured to send, by the first device, when the first device does not complete decoding of the first data information at the first feedback moment, first request information to the second device at the first feedback moment, where the first request information indicates the first device to delay feeding back the result of decoding the first data information by the first device to the second device, and the first feedback moment is a moment that is configured by the second device and at which the first device needs to feed back the result of decoding the first data information to the second device. It should be understood that a specific process in which the units perform the foregoing corresponding steps is described in detail in the foregoing method embodiments, and for brevity, details are not described herein.

It should be understood that the apparatus 1000 may correspond to the first device in the method according to embodiments of this application, and the apparatus 1000 may include units configured to perform the method performed by the first device in FIG. 9. In addition, the units in the apparatus 1000 and the foregoing other operations and/or functions are separately intended to implement corresponding procedures in FIG. 9.

When the apparatus 1000 is configured to perform the method in FIG. 9, the processing unit 1101 may be configured to decode the first data information, and the processing unit 1100 may be further configured to stop decoding the first data information when the first condition is met. The transceiver unit 1200 may be configured to receive condition information, where the condition information indicates the first condition, and the first condition is a condition for the first device to stop decoding the first data information. It should be understood that a specific process in which the units perform the foregoing corresponding steps is described in detail in the foregoing method embodiments, and for brevity, details are not described herein.

Figure 12:
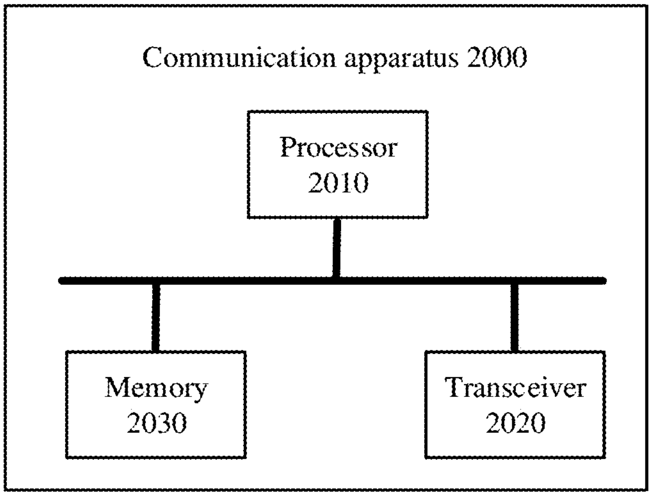
Figure 13:
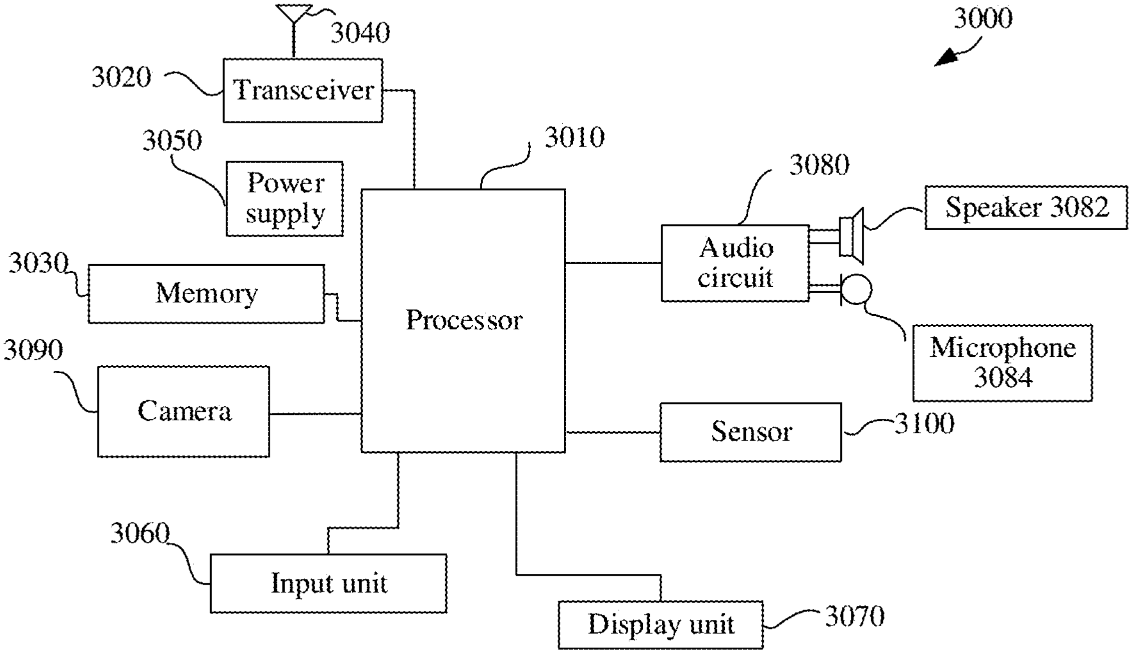

It should be further understood that when the apparatus 1000 is the first device, the transceiver unit 1200 in the apparatus 1000 may be implemented by using a transceiver, for example, may correspond to the transceiver 2020 in the apparatus 2000 shown in FIG. 12 or a transceiver 3020 in a terminal device 3000 shown in FIG. 13. The processing unit 1100 in the apparatus 1000 may be implemented by using at least one processor, for example, may correspond to the processor 2010 in the apparatus 2000 shown in FIG. 12 or the processor 3010 in the terminal device 3000 shown in FIG. 13.

It should be further understood that when the apparatus 1000 is a chip or chip system configured in a first device, the transceiver unit 1200 in the apparatus 1000 may be implemented by an input/output interface, a circuit, or the like; and the processing unit 1100 in the apparatus 1000 may be implemented by a processor, a microprocessor, an integrated circuit, or the like integrated in the chip or chip system.

It should be understood that the apparatus 1000 may correspond to the second device in the method according to embodiments of this application, and the apparatus 1000 may include units configured to perform the method performed by the second device in FIG. 4. In addition, the units in the apparatus 1000 and the foregoing other operations and/or functions are separately intended to implement corresponding procedures in FIG. 4.

When the apparatus 1000 is configured to perform the method in FIG. 4, the transceiver unit 1200 may be configured to send first data information. The transceiver unit 1200 may be further configured to send first information, where the first information indicates a plurality of first moments, the plurality of first moments are used by the first device to send second information to the second device, and the second information indicates a result of decoding first data information by the first device. The transceiver unit 1200 may be further configured to send the second information at a first feedback moment, and the first feedback moment is a moment in the plurality of first moments. It should be understood that a specific process in which the units perform the foregoing corresponding steps is described in detail in the foregoing method embodiments, and for brevity, details are not described herein.

It should be understood that the apparatus 1000 may correspond to the second device in the method according to embodiments of this application, and the apparatus 1000 may include units configured to perform the method performed by the second device in FIG. 7. In addition, the units in the apparatus 1000 and the foregoing other operations and/or functions are separately intended to implement corresponding procedures in FIG. 7.

When the apparatus 1000 is configured to perform the method in FIG. 7, the transceiver unit 1200 may be configured to send first data information, and the transceiver unit 1200 may be further configured to receive first request information sent by the first device at the first feedback moment, where the first request information indicates the first device to delay feeding back the result of decoding the first data information by the first device to the second device, and the first feedback moment is a moment that is configured by the second device and at which the first device needs to feed back the result of decoding the first data information to the second device. It should be understood that a specific process in which the units perform the foregoing corresponding steps is described in detail in the foregoing method embodiments, and for brevity, details are not described herein.

It should be understood that the apparatus 1000 may correspond to the second device in the method according to embodiments of this application, and the apparatus 1000 may include units configured to perform the method performed by the second device in FIG. 9. In addition, the units in the apparatus 1000 and the foregoing other operations and/or functions are separately intended to implement corresponding procedures in FIG. 9.

When the apparatus 1000 is configured to perform the method in FIG. 9, the transceiver unit 1200 may be configured to send first data information, and the transceiver unit 1200 may be further configured to send condition information, where the condition information indicates the first condition, and the first condition is a condition for the first device to stop decoding the first data information. It should be understood that a specific process in which the units perform the foregoing corresponding steps is described in detail in the foregoing method embodiments, and for brevity, details are not described herein.

It should be further understood that when the apparatus 1000 is the second device, the transceiver unit 1200 in the apparatus 1000 may be implemented by using a transceiver, for example, may correspond to the transceiver 2020 in the apparatus 2000 shown in FIG. 12 or a transceiver 3020 in a terminal device 3000 shown in FIG. 13. The processing unit 1100 in the apparatus 1000 may be implemented by using at least one processor, for example, may correspond to the processor 2010 in the apparatus 2000 shown in FIG. 12 or the processor 3010 in the terminal device 3000 shown in FIG. 13.

It should be further understood that when the apparatus 1000 is a chip or chip system configured in a second device, the transceiver unit 1200 in the apparatus 1000 may be implemented by an input/output interface, a circuit, or the like; and the processing unit 1100 in the apparatus 1000 may be implemented by a processor, a microprocessor, an integrated circuit, or the like integrated in the chip or chip system.

FIG. 12 is another schematic block diagram of an apparatus 2000 according to an embodiment of this application. As shown in FIG. 12, the apparatus 2000 includes a processor 2010, a transceiver 2020, and a memory 2030. The processor 2010, the transceiver 2020, and the memory 2030 communicate with each other via an internal connection path. The memory 2030 is configured to store instructions. The processor 2010 is configured to execute the instructions stored in the memory 2030, to control the transceiver 2020 to send a signal and/or receive a signal. Optionally, the processor 2010 and the memory 2030 may be integrated together.

It should be understood that the apparatus 2000 may correspond to the second device or the first device in the foregoing method embodiments, and may be configured to perform steps and/or procedures performed by the second device or the first device in the foregoing method embodiments. Optionally, the memory 2030 may include a read-only memory and a random access memory, and provide instructions and data to the processor. A part of the memory may further include a non-volatile random access memory. The memory 2030 may be a separate component, or may be integrated in the processor 2010. The processor 2010 may be configured to execute the instructions stored in the memory 2030, and when the processor 2010 executes the instructions stored in the memory, the processor 2010 is configured to perform the steps and/or the procedures corresponding to the second device or the first device in the foregoing method embodiments.

Optionally, the apparatus 2000 is the first device in the foregoing embodiment.

Optionally, the apparatus 2000 is the second device in the foregoing embodiment.

The transceiver 2020 may include a transmitter and a receiver. The transceiver 2020 may further include an antenna. There may be one or more antennas. The processor 2010, the memory 2030, and the transceiver 2020 may be devices integrated in different chips. For example, the processor 2010 and the memory 2030 may be integrated in a baseband chip, while the transceiver 2020 may be integrated in a radio frequency chip. The processor 2010, the memory 2030, and the transceiver 2020 may alternatively be devices integrated in a same chip. This is not limited in this application.

Optionally, the apparatus 2000 is a component configured in the first device, for example, a circuit, a chip, or a chip system.

Optionally, the apparatus 2000 is a component configured in the second device, for example, a circuit, a chip, or a chip system.

The transceiver 2020 may alternatively be a communication interface, for example, an input/output interface or a circuit. The transceiver 2020, the processor 2010, and the memory 2030 may all be integrated in a same chip, for example, integrated in a baseband chip.

FIG. 13 is a schematic diagram of a structure of a terminal device 3000 according to an embodiment of this application. The terminal device 3000 may be applied to the system shown in FIG. 1, to perform a function of the first device or the second device in the foregoing method embodiments. As shown in FIG. 13, the terminal device 3000 includes a processor 3010 and a transceiver 3020. Optionally, the terminal device 3000 further includes a memory 3030. The processor 3010, the transceiver 3020, and the memory 3030 may communicate with each other via an internal connection path, to transfer a control signal and/or a data signal. The memory 3030 is configured to store a computer program. The processor 3010 is configured to invoke the computer program from the memory 3030 and run the computer program, to control the transceiver 3020 to receive/send a signal. Optionally, the terminal device 3000 may further include an antenna 3040, configured to send, by using a radio signal, uplink data or uplink control signaling output by the transceiver 3020.

The processor 3010 and the memory 3030 may be combined into a processing apparatus. The processor 3010 is configured to execute program code stored in the memory 3030, to implement the foregoing function. During specific implementation, the memory 3030 may be alternatively integrated in the processor 3010, or may be independent of the processor 3010. The processor 3010 may correspond to the processing unit 1100 in FIG. 11 or the processor 2010 in FIG. 12.

The transceiver 3020 may correspond to the transceiver unit 1200 in FIG. 11 or the transceiver 2020 in FIG. 12. The transceiver 3020 may include a receiver (which is also referred to as a receiver machine or a receiver circuit) and a transmitter (which is also referred to as a transmitter machine or a transmitter circuit). The receiver is configured to receive a signal, and the transmitter is configured to transmit a signal.

It should be understood that, the terminal device 3000 shown in FIG. 13 can implement each process performed by the terminal device in the method embodiment shown in FIG. 2. Operations and/or functions of the modules in the terminal device 3000 are separately intended to implement corresponding procedures in the foregoing method embodiments. For details, refer to the descriptions in the foregoing method embodiments. To avoid repetition, detailed descriptions are properly omitted herein.

The processor 3010 may be configured to perform an action that is implemented inside the terminal device and that is described in the foregoing method embodiments, and the transceiver 3020 may be configured to perform an action of sending or receiving that is performed by the terminal device to or from the access network device and that is described in the foregoing method embodiments. For details, refer to the descriptions in the foregoing method embodiments. Details are not described herein again.

Optionally, the terminal device 3000 may further include a power supply 3050, configured to supply power to various devices or circuits in the terminal device.

Besides, to make functions of the terminal device to be more complete, the terminal device 3000 may further include one or more of an input unit 3060, a display unit 3070, an audio circuit 3080, a camera 3090, a sensor 3100, and the like. The audio circuit may further include a speaker 3082, a microphone 3084, and the like.

Figure 14:
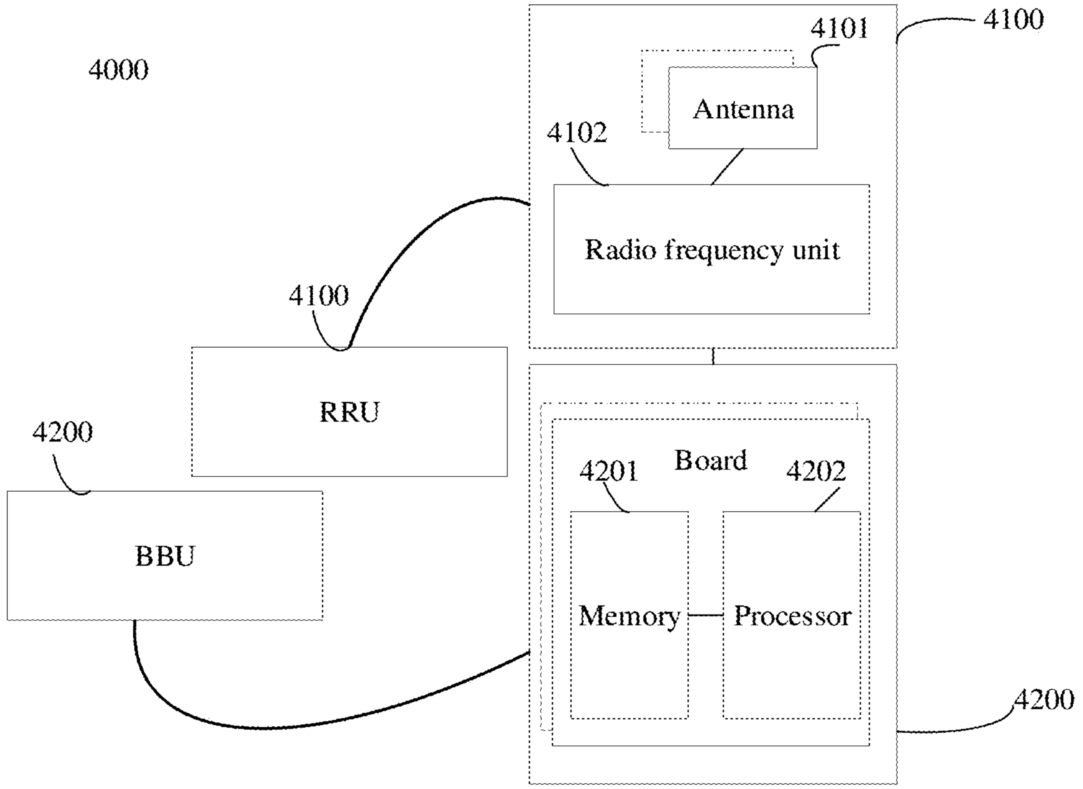

FIG. 14 is a schematic diagram of a structure of an access network device according to an embodiment of this application, for example, may be a schematic diagram of a structure of a base station. The base station 4000 may be applied to the system shown in FIG. 1, to perform a function of the first device or the second device in the foregoing method embodiments. As shown in FIG. 14, the base station 4000 may include one or more radio frequency units, such as a remote radio unit (RRU) 4100 and one or more baseband units (BBU) 4200. The RRU 4100 may be referred to as a transceiver unit, and may correspond to the transceiver unit 1200 in FIG. 11 or the transceiver 2020 in FIG. 12. Optionally, the RRU 4100 may also be referred to as a transceiver machine, a transceiver circuit, a transceiver, or the like, and may include at least one antenna 4101 and a radio frequency unit 4102. Optionally, the RRU 4100 may include a receiver unit and a transmitter unit. The receiver unit may correspond to a receiver (which is also referred to as a receiver machine or a receiver circuit). The transmitter unit may correspond to a transmitter (which is also referred to as a transmitter machine or a transmitter circuit). The RRU 4100 part is mainly configured to receive and transmit radio frequency signals and perform conversion between a radio frequency signal and a baseband signal, for example, configured to send indication information to a terminal device. The BBU 4200 part is mainly configured to perform baseband processing, control the base station, and the like. The RRU 4100 and the BBU 4200 may be disposed together physically, or may be separately disposed physically, that is, a distributed base station.

The BBU 4200 is a control center of the base station, may also be referred to as a processing unit, may correspond to the processing unit 1101 in FIG. 11 or the processor 2010 in FIG. 12, and is mainly configured to perform baseband processing functions such as channel encoding, multiplexing, modulation, and spectrum spreading. For example, the BBU (the processing unit) may be configured to control the base station to perform an operation procedure related to the access network device in the foregoing method embodiments, for example, generate the indication information.

In an example, the BBU 4200 may include one or more boards. The plurality of boards may jointly support a radio access network (for example, an 5G network) that uses a single access standard, or may separately support radio access networks (for example, an LTE network, a 5G network, or another network) that use different access standards. The BBU 4200 further includes a memory 4201 and a processor 4202. The memory 4201 is configured to store necessary instructions and data. The processor 4202 is configured to control the base station to perform a necessary action, for example, configured to control the base station to perform an operation procedure related to the access network device in the foregoing method embodiments. The memory 4201 and the processor 4202 may serve one or more boards. In other words, a memory and a processor may be disposed on each board. Alternatively, a plurality of boards may share a same memory and a same processor. In addition, a necessary circuit may further be disposed on each board.

It should be understood that the base station 4000 shown in FIG. 14 can implement each process related to the access network device in the method embodiments. Operations and/or functions of the modules in the base station 4000 are separately intended to implement corresponding procedures in the foregoing method embodiments. For details, refer to the descriptions in the foregoing method embodiments. To avoid repetition, detailed descriptions are properly omitted herein.

The BBU 4200 may be configured to perform an action that is implemented inside the access network device and that is described in the foregoing method embodiments. The RRU 4100 may be configured to perform an action that is of the access network device sending information to or receiving information from the terminal device and that is described in the foregoing method embodiments. For details, refer to the descriptions in the foregoing method embodiments. Details are not described herein again.

It should be understood that the base station 4000 shown in FIG. 14 is merely a possible form of the access network device, and shall not constitute any limitation on this application. The method provided in this application is applicable to other forms of access network device. For example, the network device includes an AAU, and may further include a CU and/or a DU; includes a BBU and an adaptive radio unit (ARU); or includes a BBU. Alternatively, the network device may be customer premises equipment (CPE), or may be in another form. A specific form of the access network device is not limited in this application.

The CU and/or the DU may be configured to perform an action that is implemented inside the access network device and that is described in the foregoing method embodiments. The AAU may be configured to perform an action that is of the access network device sending information to or receiving information from the terminal device and that is described in the foregoing method embodiments. For details, refer to the descriptions in the foregoing method embodiments. Details are not described herein again.

This application further provides a processing apparatus, including at least one processor. The at least one processor is configured to execute a computer program stored in a memory, so that the processing apparatus performs the method performed by the terminal device or the access network device in any one of the foregoing method embodiments.

An embodiment of this application further provides a processing apparatus, including a processor and a communication interface. The communication interface is coupled to the processor. The communication interface is configured to input and/or output information. The information includes at least one of instructions and data. The processor is configured to execute a computer program, so that the processing apparatus performs the method performed by the terminal device or the access network device in any one of the foregoing method embodiments.

An embodiment of this application further provides a processing apparatus, including a processor and a memory. The memory is configured to store a computer program. The processor is configured to invoke the computer program from the memory and run the computer program, so that the processing apparatus performs the method performed by the terminal device or the access network device in any one of the foregoing method embodiments.

It should be understood that the processing apparatus may be one or more chips. For example, the processing apparatus may be a field programmable gate array (FPGA), an application-specific integrated chip (ASIC), a system on chip (SoC), a central processing unit (CPU), a network processor (NP), a digital signal processing circuit (DSP), a microcontroller (MCU), a programmable controller (PLD), or another integrated chip.

In an implementation process, steps in the foregoing methods can be implemented by using a hardware integrated logical circuit in the processor, or by using instructions in a form of software. The steps of the method disclosed with reference to embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

It should be noted that, the processor in embodiments of this application may be an integrated circuit chip, and has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application specific integrated circuit (ASIC), a field programmable gate array (FPGA) or another programmable logic device, a discrete gate or a transistor logic device, or a discrete hardware component. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in this embodiment of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another proper type.

According to the methods provided in embodiments of this application, this application further provides a computer program product. The computer program product includes computer program code. When the computer program code is run on a computer, the computer is enabled to perform the method performed by the terminal device or the method performed by the network device in the embodiment shown in FIG. 3.

According to the methods provided in embodiments of this application, this application further provides a computer-readable storage medium. The computer-readable storage medium stores program code. When the program code is run on a computer, the computer is enabled to perform the method performed by the terminal device or the method performed by the network device in the embodiment shown in FIG. 3.

According to the method provided in embodiments of this application, this application further provides a system. The system includes the foregoing one or more terminal devices and the foregoing one or more network devices.

The network device and the terminal device in the foregoing apparatus embodiments completely correspond to the network device and the terminal device in the method embodiments. A corresponding module or unit performs a corresponding step. For example, the communication unit (the transceiver) performs a receiving or sending step in the method embodiments, and a step other than the sending step and the receiving step may be performed by the processing unit (the processor). For a function of a specific unit, refer to a corresponding method embodiment. There may be one or more processors.

In the foregoing embodiments, the terminal device may be used as an example of a receiving device, and the network device may be used as an example of a sending device. However, this shall not constitute any limitation on this application. For example, alternatively, the sending device and the receiving device may be both terminal devices or the like. Specific types of the sending device and the receiving device are not limited in this application.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

It should be understood that, in embodiments of this application, numbers "first", "second", and the like are merely for distinguishing between different objects, for example, to distinguish between different network devices, and do not constitute a limitation on the scope of embodiments of this application. Embodiments of this application are not limited thereto.

It should be further understood that, in this application, both "when" and "if" mean that a network element performs corresponding processing in an objective situation, but do not constitute a limitation on time, do not require that the network element has a determining action during implementation, and do not mean other limitations either.

It should be further understood that, in this application, "at least one" means one or more, and "a plurality of" means two or more.

It should be further understood that, in embodiments of this application, "B corresponding to A" indicates that B is associated with A, and B may be determined based on A. However, it should be further understood that determining B based on A does not mean that B is determined based only on A. B may alternatively be determined based on A and/or other information.

It should also be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Unless otherwise specified, an expression used in this application similar to an expression that "an item includes one or more of the following: A, B, and C" usually means that the item may be any one of the following: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and another combination of A, B and C. In the foregoing descriptions, three elements A, B, and C are used as an example to describe an optional case of the item. When an expression is "the item includes at least one of the following: A, B, . . . , and X", in other words, more elements are included in the expression, a case to which the item is applicable may also be obtained according to the foregoing rule.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:

receiving, by a first device, first information from a second device, wherein the first information indicates a plurality of first moments, the plurality of first moments are configured to be used by the first device to send second information to the second device, and the second information indicates a result of decoding first data information by the first device;

decoding, by the first device, the first data information; and sending, by the first device, the second information to the second device at a first feedback moment, wherein the first feedback moment is comprised in the plurality of first moments, and wherein the first feedback moment is selected among the plurality of first moments for sending the second information based on being an earliest first moment in the plurality of first moments that is after the first device completes decoding of the first data information.

2. The method according to claim 1, wherein the plurality of first moments further comprise a second feedback moment, the second feedback moment is a moment at which the first device sends third information to the second device, the third information indicates whether the first device completes decoding of the first data information at the second feedback moment, and the method further comprises:

sending, by the first device, the third information to the second device at the second feedback moment.

3. A method, comprising:

sending, by a second device, first information to a first device, wherein the first information indicates a plurality of first moments, the plurality of first moments are configured to be used by the first device to send second information to the second device, and the second information indicates a result of decoding first data information by the first device;

sending, by the second device, the first data information to the first device; and receiving, by the second device, the second information sent by the first device at a first feedback moment, wherein the first feedback moment is comprised in the plurality of first moments, and wherein the first feedback moment is selected among the plurality of first moments for sending the second information based on being an earliest first moment in the plurality of first moments that is after the first device completes decoding of the first data information.

4. The method according to claim 3, wherein the plurality of first moments further comprises a second feedback moment, the second feedback moment is a moment at which the first device sends third information to the second device, the third information indicates whether the first device completes decoding of the first data information at the second feedback moment, and the method further comprises:

receiving, by the second device, the third information sent by the first device at the second feedback moment.

5. The method according to claim 4, further comprising:

determining, by the second device based on the second information, whether to send retransmitted first data information to the first device; and sending, by the second device, the retransmitted first data information to the first device when the second device determines, based on the second information, to send the retransmitted first data information to the first device.

6. The method according to claim 1, wherein the first information indicates the plurality of first moments by indicating a plurality of time offsets.

7. The method according to claim 6, wherein the plurality of time offsets is a plurality of k values.

8. The method according to claim 1, further comprising:

attempting to decode second data information; and when the second data information is not completely decoded at a last first moment in the plurality of first moments, stopping decoding, and sending the second information at the last first moment.

9. The method according to claim 1, wherein the first information is carried in downlink control information.

10. The method according to claim 9, wherein the first information is carried in a bit field of two or more bits.

11. The method according to claim 3, wherein the first information indicates the plurality of first moments by indicating a plurality of time offsets.

12. The method according to claim 11, wherein the plurality of time offsets is a plurality of k values.

13. The method according to claim 3, wherein the first information is carried in downlink control information.

14. The method according to claim 13, wherein the first information is carried in a bit field of two or more bits.

15. A first device, comprising:

at least one processor; and memory storing instructions that are executable by the at least one processor, wherein execution of the instructions cause the first device to:

receive first information from a second device, wherein the first information indicates a plurality of first moments, the plurality of first moments are configured to be used by the first device to send second information to the second device, and the second information indicates a result of decoding first data information by the first device;

decode the first data information; and send the second information to the second device at a first feedback moment, wherein the first feedback moment is comprised in the plurality of first moments, and wherein the first feedback moment is selected among the plurality of first moments for sending the second information based on being an earliest first moment in the plurality of first moments that is after the first device completes decoding of the first data information.

16. The first device according to claim 15, wherein the plurality of first moments further comprise a second feedback moment, the second feedback moment is a moment at which the first device sends third information to the second device, the third information indicates whether the first device completes decoding of the first data information at the second feedback moment; and wherein execution of the instructions further causes the first device to:

send the third information to the second device at the second feedback moment.

17. The first device according to claim 15, wherein the first information indicates the plurality of first moments by indicating a plurality of time offsets.

18. The first device according to claim 17, wherein the plurality of time offsets is a plurality of k values.

19. The first device according to claim 15, wherein execution of the instructions further causes the first device to:

attempt to decode second data information; and when the second data information is not completely decoded at a last first moment in the plurality of first moments, stop decoding, and send the second information at the last first moment.

20. The first device according to claim 15, wherein the first information is carried in downlink control information.

* * * * *